United States Patent
Detweiler et al.

[19]

[11] Patent Number: 5,844,679
[45] Date of Patent: Dec. 1, 1998

[54] SYSTEM FOR ADJUSTING THE ORIENTATION OF A PLANE OF LASER LIGHT

[75] Inventors: Philip Lynn Detweiler; Francisco Roberto Green; Frank Beard Douglas, all of Tipp City, Ohio

[73] Assignee: Spectra Precision, Inc., Dayton, Ohio

[21] Appl. No.: 833,978

[22] Filed: Apr. 11, 1997

[51] Int. Cl.⁶ .................................. G01B 11/26
[52] U.S. Cl. .......................... 356/248; 356/249
[58] Field of Search .................. 356/149, 153, 356/248, 249, 250; 350/16; 33/374, 381–384

[56] References Cited

U.S. PATENT DOCUMENTS

| | | | |
|---|---|---|---|
| 3,936,197 | 2/1976 | Aldrink et al. | 356/250 |
| 4,062,634 | 12/1977 | Rando et al. | 356/248 |
| 4,221,483 | 9/1980 | Rando | 356/250 |
| 4,662,707 | 5/1987 | Teach et al. | 350/6.5 |
| 4,895,440 | 1/1990 | Cain et al. | 356/5 |
| 4,903,054 | 2/1990 | Wible | 250/561 |
| 5,144,486 | 9/1992 | Hart | 359/629 |
| 5,257,279 | 10/1993 | Dugan et al. | 372/101 |
| 5,375,663 | 12/1994 | Teach | 172/4.5 |
| 5,513,001 | 4/1996 | Ohtomo et al. | 356/249 |
| 5,517,023 | 5/1996 | Ohtomo et al. | 250/234 |
| 5,764,349 | 6/1998 | Vanneman | 356/138 |

FOREIGN PATENT DOCUMENTS

| | | |
|---|---|---|
| 0643283A1 | 3/1995 | European Pat. Off. |
| 6-201383 | 7/1994 | Japan . |

*Primary Examiner*—Frank G. Font
*Assistant Examiner*—Michael P. Stafira
*Attorney, Agent, or Firm*—Killworth, Gottman, Hagan & Schaeff, L.L.P.

[57] ABSTRACT

A system for adjusting the orientation of a plane defined by a rotating laser beam from a laser transmitter is provided. The laser beam is swept across one or more targets having a plurality of sections. The targets each include a first reflective section and a second reflective section with a non-reflective section positioned therebetween. The non-reflective section includes a portion which slopes across the reflective sections. A photodetector detects a signal representative of the laser beam reflected from each of the targets. The orientation of the laser beam is adjusted until the laser beam traverses the center of the target at which point the width of the first reflective section equals the width of the second reflective section. A processor calculates the distance or angle in which to adjust the laser transmitter so that the laser beam traverses the center of the target once the laser beam traverses the portion of the target including the sloped non-reflective section.

61 Claims, 15 Drawing Sheets

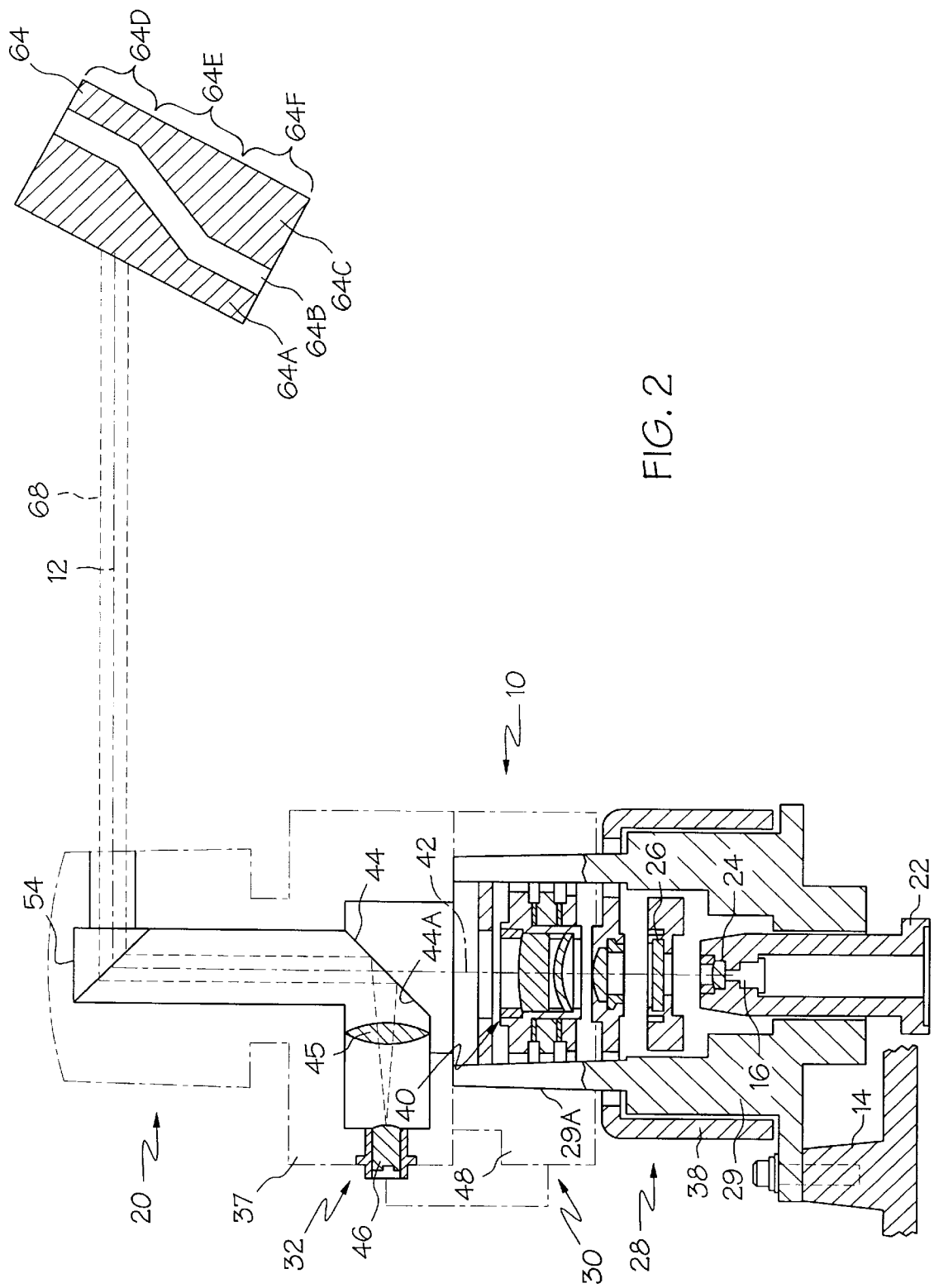

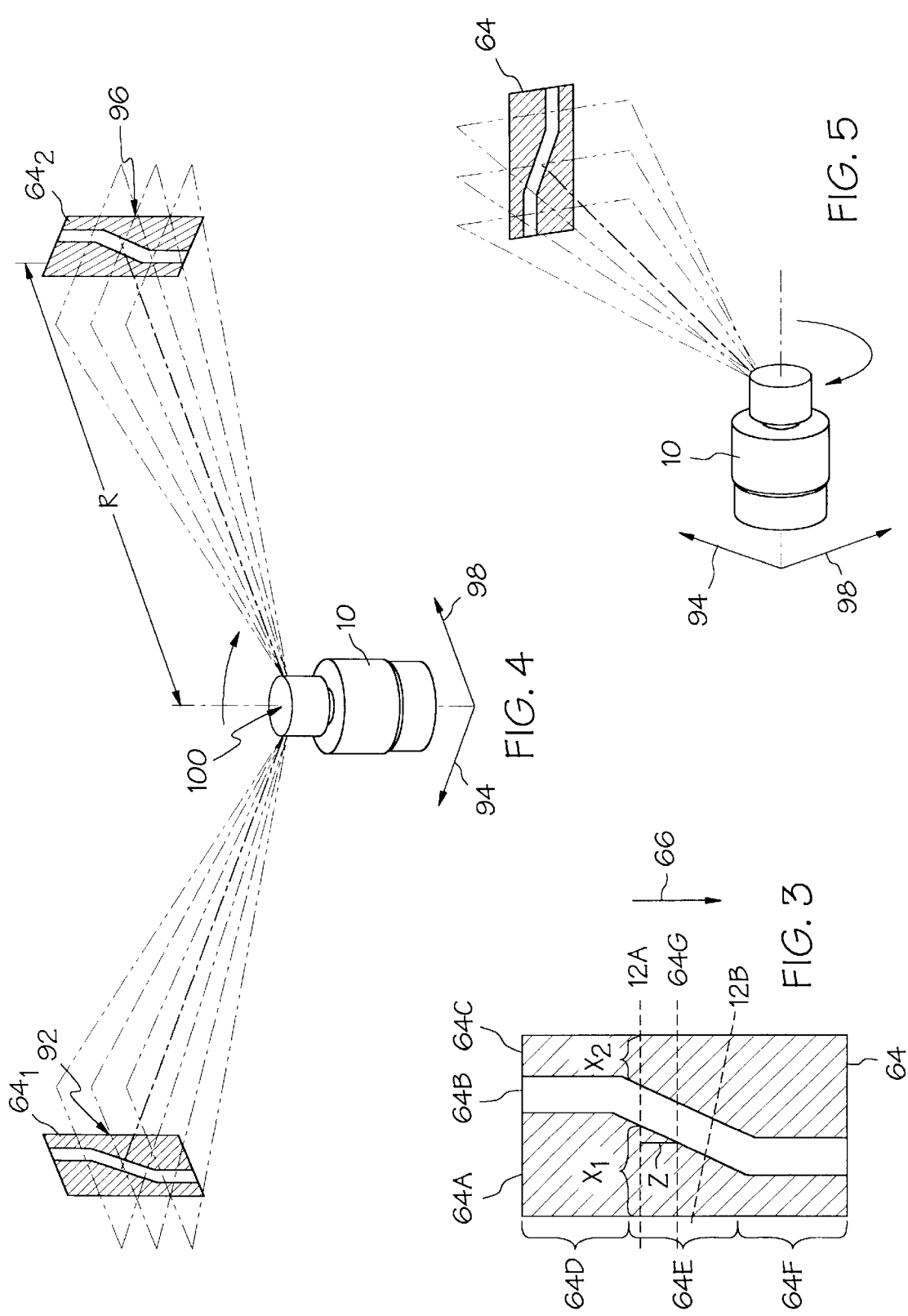

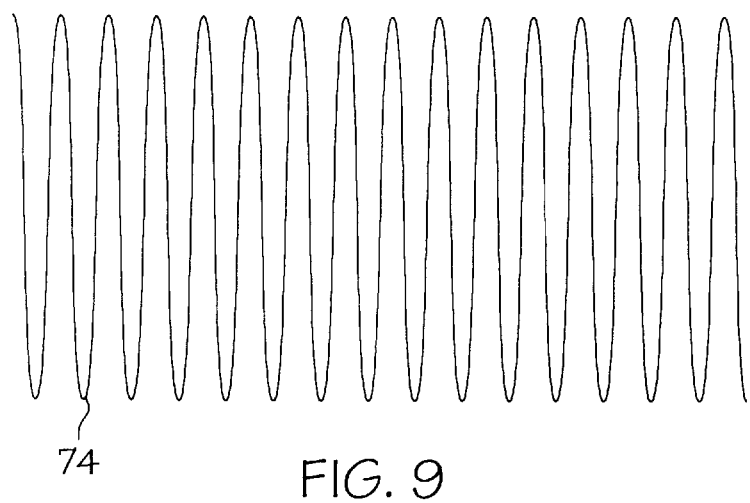
74  FIG. 9

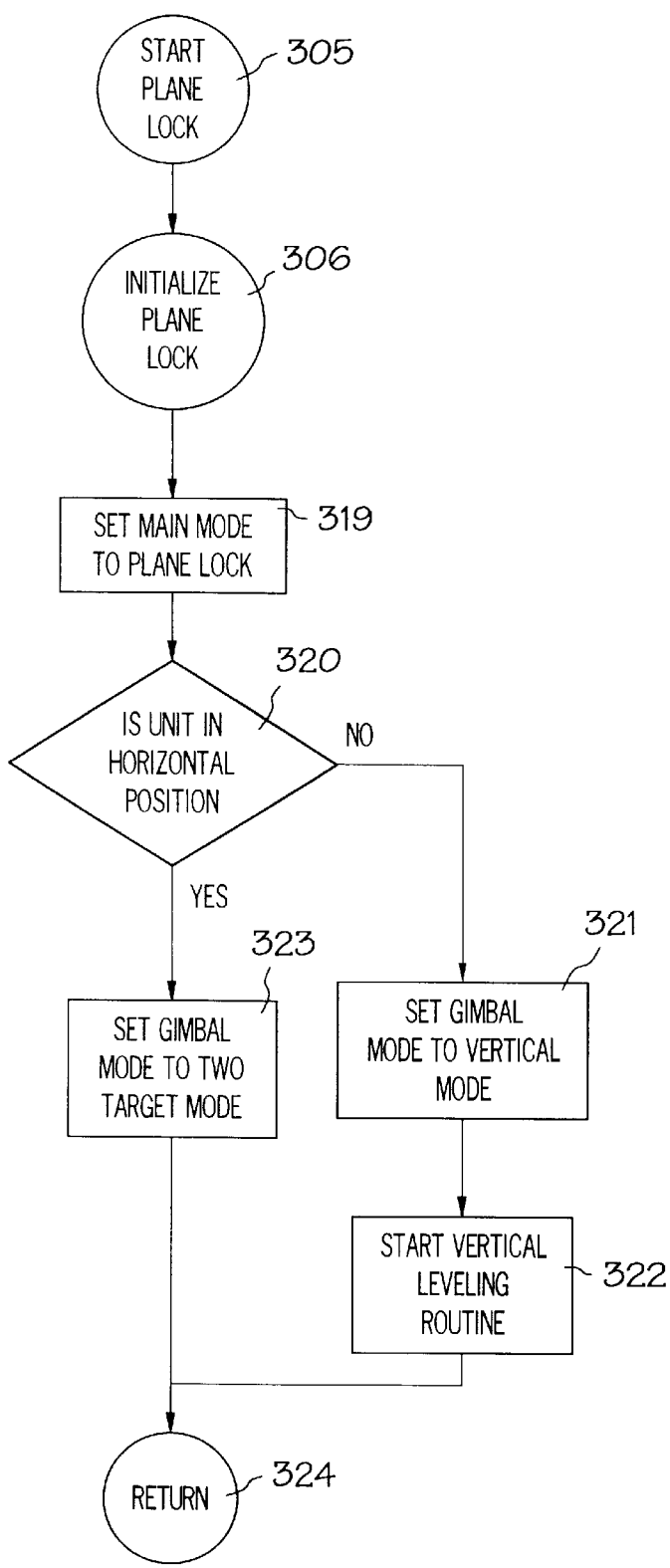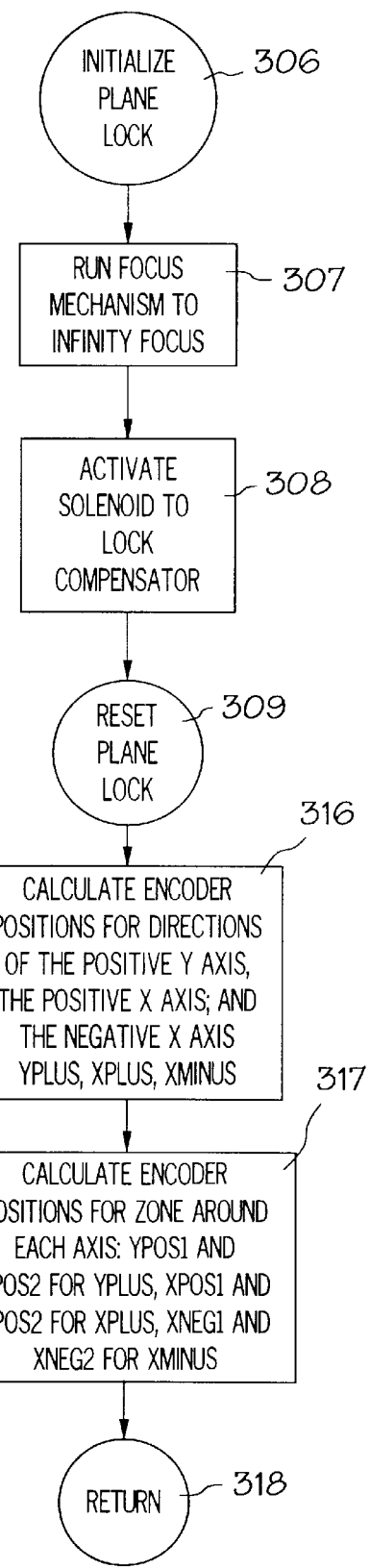
FIG. 15
FIG. 16

SYSTEM FOR ADJUSTING THE ORIENTATION OF A PLANE OF LASER LIGHT

CROSS-REFERENCES TO RELATED APPLICATIONS

This application is related to commonly assigned U.S. patent application Ser. Nos.: 08/834,472, POSITION LEVELING SENSOR FOR A LASER TRANSMITTER, filed Apr. 11, 1997, by Jackson et al.; 08/834,473, AUTOFOCUSING SYSTEM FOR A LASER TRANSMITTER, filed Apr. 11, 1997, by Green et al.; 08/834,477, FOCUSING MECHANISM USING A THIN DIAPHRAGM, filed Apr. 11, 1997, by Hayes; and 08/834,476, LASER TRANSMITTER INCORPORATING TARGET DITHER, filed Apr. 11, 1997, by Green et al., the disclosures of which are incorporated herein by reference.

BACKGROUND OF THE INVENTION

The present invention generally relates to adjusting the orientation of a plane in which a laser beam is rotated and, in particular, to the automatic adjustment of the plane as defined by one or more targets.

Laser light systems have been employed in numerous surveying and construction applications. In one such system, a laser light transmitting device provides a rotating laser beam which establishes a reference plane. Typically, the rotating laser beam is used to provide a continuous plane of light that creates either a constant horizontal bench mark of elevation or a selected plane over an entire work area. The laser light is either detected by the naked eye or by one or more laser beam detectors, placed at considerable distances from the transmitting device. Various construction tasks are performed based on the visual perception of the laser light, while the detectors are used to intercept the rotating laser beam and determine a proper elevation and grade at selected points throughout the work area.

In the laser light transmitting device, the plane of light is produced by projecting the beam generally upward and then deflecting the beam ninety degrees within a pentaprism or pentamirror assembly. The pentaprism assembly is rotated about a vertical axis within the transmitting device to cause the beam to rotate and define the reference plane. The laser transmitting device may be adjusted so that the orientation of the rotating beam of light defines a desired plane with respect to a generally horizontal or vertical plane.

Manual systems have been used to adjust the orientation of the rotating beam of light and thus define the desired plane. The laser light transmitting device may be tilted along one axis and then the other axis to set the desired plane. Such systems are disadvantageous in that their accuracies are dependent, in part, upon the skill of the operator in the initial adjustment and orientation of the systems. Moreover, the desired plane is difficult to duplicate after the initial setting.

Automatic systems have also been used to adjust the orientation of the rotating beam of light. One such system includes a corner cube positioned along a desired plane for receiving the rotating beam of light from a light source. The corner cube reflects nearly all of the light back towards an external receiver which is slightly offset from the light source. The external receiver transmits a signal to the light source to adjust the orientation of the light source so that the rotating beam of light intersects the desired plane. Such a system is disadvantageous because the corner cube is very expensive and has a relatively small aperture. The system is complicated to operate as the light source must be positioned so that the rotating beam of light is positioned generally along the desired plane so that at least some light is reflected back from the small aperture to the external receiver. Further, the accuracy of the system is reduced as the reflected light from the corner cube is slightly offset from the projected light.

Accordingly, there is a need in the art for an automatic and accurate system for adjusting the orientation of a plane of laser light which is easy to operate and inexpensive, and for an improved method by which such a focusing system operates.

SUMMARY OF THE INVENTION

The present invention meets the aforementioned needs by providing a laser transmitter in which a plane defined by a rotating laser beam is adjusted to a desired orientation quickly, easily and inexpensively.

According to a first aspect of the present invention, a process for adjusting the orientation of a plane in which a laser beam is rotated comprises projecting the laser beam from a laser source such that it rotates in a plane and sweeps across at least a first target. The first target includes a plurality of reflective sections and at least one non-reflective section. A laser beam reflected from the first target is detected and a first signal having a first waveform representative of the reflected laser beam from the first target is generated. The orientation of the plane is adjusted in response to the first signal.

The plurality of reflective sections may include a first reflective section and a second reflective section with the at least one non-reflective section positioned therebetween. The at least one non-reflective section may include a first portion which slopes across the first and second reflective sections. The target may also comprise a first target region in which a first dimension of the first reflective region is greater than a second dimension of the second reflective region, a second target region in which the first dimension decreases proportionally with an increase of the second dimension, and a third target region in which the first dimension is less than the second dimension. Preferably, the first dimension substantially equals the second dimension substantially in a center of the second target region.

The step in which the orientation of the plane is adjusted includes calculating a distance through which to move the laser source so that the plane intersects the center of the second target region, and moving the laser source the calculated distance so that the plane intersects the center of the second target region. The distance is determined by the equation $Z = m^* w^* R(TP_1 - TP_3)/2$, where m defines a slope of the at least one non-reflective section in the second target region, w defines an angular velocity of the rotating laser beam, R defines a distance between the target and the laser transmitter, $TP_1$ defines a time period in which the rotating laser beam sweeps across the first reflective section of the target, and $TP_3$ defines a time period in which the rotating laser beam sweeps across the second reflective section of the target.

The step in which the orientation of the plane is adjusted may also include calculating an angle in which to adjust an angular position of the laser source so that the plane intersects the center of the second target region, and adjusting the angular position of the laser source by the angle so that the plane intersects the center of the second target region. The angle is determined by the equation $\theta = m^* w^* (TP_1 - TP_3)/2$ where m defines a slope of the at least one non-reflective section in the second target region, w defines an angular velocity of the rotating laser beam, $TP_1$ defines a time period in which the rotating laser beam sweeps across the first reflective section of the target, and $TP_3$ defines a time period in which the rotating laser beam sweeps across the second reflective section of the target.

The target may also include a first dimension of the first reflective section which increases in a first direction while a second dimension of the second reflective section decreases in the first direction with the rotating laser beam sweeping across the first target generally perpendicular to the first direction. The process may further include the steps of determining a distance between the laser source and the first target, amplitude modulating the laser beam, dithering the laser beam across the first target, determining if the reflected laser beam is a valid reflection, and determining if the first target has moved. A valid reflection is determined by measuring a width for each of at least two of the sections of the target based on the signal, calculating a measured ratio based on the measured widths, and determining if the measured ratio corresponds to an actual ratio based on actual widths of the sections of the target.

The first waveform may include a first portion having a first duration corresponding to a time period when the laser beam traverses the first reflective section and a second portion having a second duration corresponding to a time period when the laser beam traverses the second reflective section. The planar orientation of the laser beam is then adjusted until a ratio of the first duration to the second duration substantially equals a first value.

The first waveform may include a first portion having a first duration corresponding to a time period when the laser beam traverses the first reflective section and a second portion having a second duration corresponding to a time period when the laser beam traverses the second reflective section. The planar orientation of the laser beam is then adjusted until a difference between the first and second durations substantially equals a first value.

The process may further comprise the step of positioning the first target at a first point having a predetermined angular orientation with respect to a first axis. The laser beam may be projected so that the laser beam intersects a second point having a predetermined angular orientation with respect to a second axis. The orientation of the plane may be adjusted so that the plane corresponds to a plane defined by the first point, the second point and a position of the laser source. The plane may be adjusted so that the second point has a predetermined angular orientation with respect to a second axis which is substantially parallel or perpendicular with respect to a ground surface.

The process may further include the steps of positioning the first target at a first point having a predetermined angular orientation with respect to a first axis and positioning a second target at a second point having a predetermined angular orientation with respect to a second axis. The second target includes a plurality of reflective sections and at least one non-reflective section. The reflected laser beam from the second target is detected and a second signal having a second waveform representative of the reflected laser beam from the second target is generated. The orientation of the plane is adjusted in response to the first and second signals so that the plane corresponds to a plane defined by the first point, the second point and the position of the laser source.

The process may further include the step of establishing predetermined gain and threshold values for detecting the reflected laser beam. The at least one of the gain and threshold value may be adjusted if the target has not been sighted for a predetermined period of time.

According to another aspect of the present invention, a process for adjusting the orientation of a plane in which a laser beam is rotated comprises projecting the laser beam from a laser source such that it rotates in a plane and sweeps across a first target and a second target. The first and second targets each include a plurality of reflective sections and at least one non-reflective section. A laser beam reflected from the first and second targets is detected and first and second signals having first and second waveforms representative of the reflected laser beam from the first and second targets, respectively, is generated. The orientation of the plane is adjusted in response to the first and second signals.

The process may further include positioning the first target at a first point having a predetermined angular orientation with respect to a first axis, positioning the second target at a second point having a predetermined angular orientation with respect to a second axis, and positioning the laser source at a third point. The third point is positioned at the intersection of the first and second axes. The position of the light source is adjusted in response to the first and second signals so that the orientation of the plane corresponds to a plane defined by the first, second and third points.

The first waveform may include a first portion having a first duration corresponding to a time period when the laser beam traverses a first reflective section of the first target and a second portion having a second duration corresponding to a time period when the laser beam traverses a second reflective section of the first target. The second waveform may include a third portion having a third duration corresponding to a time period when the laser beam traverses a third reflective section of the second target and a fourth portion having a fourth duration corresponding to a time period when the laser beam traverses a fourth reflective section of the second target. The orientation of the plane is adjusted until a first ratio of the first duration to the second duration substantially equals a first value and a second ratio of the third duration to by the fourth duration substantially equals a second value. Preferably, the first value substantially equals the second value.

The first waveform may include a first portion having a first duration corresponding to a time period when the laser beam traverses a first reflective section of the first target and a second portion having a second duration corresponding to a time period when the laser beam traverses a second reflective section of the first target. The second waveform may include a third portion having a third duration corresponding to a time period when the laser beam traverses a third reflective section of the second target and a fourth portion having a fourth duration corresponding to a time period when the laser beam traverses a fourth reflective section of the second target. The orientation of the plane is adjusted until a first difference between the first and second durations substantially equals a first value and a second difference between the third and fourth durations substantially equals a second value. Preferably, the first value substantially equals the second value.

According to yet another aspect of the present invention, a process for adjusting the orientation of a plane in which a laser beam is rotated comprises projecting the laser beam from a laser source such that it rotates in a plane and sweeps across at least a first target. The first target includes a plurality of reflective sections and at least one non-reflective section. A laser beam reflected from the first target is detected and a first signal having a first waveform representative of the reflected laser beam is generated. A direction to move the laser source in response to the first signal so as to adjust the orientation of the plane is indicated.

The process may further include projecting the laser beam such that it sweeps across a second target having a plurality of reflective sections and at least one non-reflective section. The reflected laser beam from the second target is detected and a second signal having a second waveform representative of the reflected laser beam from the second target is generated. Another direction to move the laser source in response to the second signal so as to further adjust the orientation of the plane is indicated. The first target may be positioned at a first point, the second target may be positioned at a second point, and the laser source may be positioned at a third point, such that the orientation of the plane of the rotating laser beam corresponds to a plane defined by the first, second and third points.

According to a further aspect of the present invention, a laser transmitting system comprises at least a first target having a plurality of reflective sections and at least one non-reflective section, a laser source for projecting a rotating laser beam which is swept across the first target, a positioning device coupled to the laser source, a photodetecting system receiving a reflected laser beam from the first target and generating a first signal having a first waveform representative of the reflected laser beam from the first target, and a processor. The positioning device includes a first member and a second member for adjusting an angular orientation of the laser source with respect to a first axis and with respect to a second axis. The processor is adapted to receive the first signal and programmed to control at least one of the first and second members of the positioning device in response to the first signal.

Preferably, the target comprises a first target region in which a first dimension of the first reflective region is greater than a second dimension of the second reflective region, a second target region in which the first dimension decreases proportionally with an increase of the second dimension, and a third target region in which the first dimension is less than the second dimension. The first dimension substantially equals the second dimension substantially in a center of the second target region.

The processor may be further programmed to calculate a distance in which to move the laser source so that the plane intersects the center of the second target region and to control the at least one of the first and second members so as to move the laser source the calculated distance so the plane intersects the center of the second target region. The distance is calculated using the formula $Z=m*w*R(TP_1-TP_3)/2$ where m defines a slope of the at least one non-reflective section in the second target region, w defines an angular velocity of the rotating laser beam, R defines a distance between the target and the laser transmitter, $TP_1$ defines a time period in which the rotating laser beam sweeps across the first reflective section of the target, and $TP_3$ defines a time period in which the rotating laser beam sweeps across the second reflective section of the target.

The processor may be further programmed to calculate an angle in which to adjust the angular position of the laser source so that the plane intersects the center of the second target region, and to control the at least one of the first and second members so as to adjust the angular position of the laser source by the angle so that the plane intersects the center of the second target region. The angle is determined by the equation $\theta=m*w(TP_1-TP_3)/2$ where m defines a slope of the at least one non-reflective section in the second target region, w defines an angular velocity of the rotating laser beam, $TP_1$ defines a time period in which the rotating laser beam sweeps across the first reflective section of the target, and $TP_3$ defines a time period in which the rotating laser beam sweeps across the second reflective section of the target.

The processor may be further programmed to determine a distance between the laser source and the first target, to determine if the reflected laser beam is a valid reflection and to determine if the first target has moved. The laser beam may also be amplitude modulated or dithered across the first target. The processor may be programmed to determine a measured width for each of at least two of the sections of the target based on the signal, calculate a measured ratio based on the measured widths, and determine if the measured ratio corresponds to an actual ratio based on actual widths of the sections of the target in order to validate the reflected laser beam.

The plurality of reflective sections may include a first reflective section and a second reflective section with the at least one non-reflective section positioned therebetween. The at least one non-reflective section may include a first portion which slopes across the first and second reflective sections. A first dimension of the first reflective section may increase in a first direction while a second dimension of the second reflective section may decrease in the first direction with the rotating laser beam being swept across the first target generally perpendicular to the first direction.

The first waveform may include a first portion having a first duration corresponding to a time period when the laser beam traverses the first reflective section and a second portion having a second duration corresponding to a time period when the laser beam traverses the second reflective section. The processor may control the at least one of the first and second members of the positioning device until a ratio of the first duration to the second duration substantially equals a first value.

The first waveform may include a first portion having a first duration corresponding to a time period when the laser beam traverses the first reflective section and a second portion having a second duration corresponding to a time period when the laser beam traverses the second reflective section. The processor may control the at least one of the first and second members of the positioning device until a difference between the first and second durations substantially equals a first value.

Preferably, the first target is positioned at a first point having a predetermined angular orientation with respect to one of the first and second axes. The processor may be further programmed to control the other of the first and second members of the positioning device so that the laser beam intersects a second point having a predetermined angular orientation with respect to the other of the first and second axes. The processor may control the first and second members so that the rotating laser beam forms a plane defined by the first point, the second point and a position of the laser source.

The system may further include a second target having a plurality of reflective sections and at least one non-reflective section. The first target may be positioned at a first point having a predetermined angular orientation with respect to the first axis. The second target may be positioned at a second point having a predetermined angular orientation with respect to the second axis. The photodetecting system may generate a second signal having a second waveform representative of the reflected laser beam from the second target. The processor may be further adapted to receive the second signal and programmed to control the first and second members to adjust the angular position of the light source with respect to the first and second axes so that the rotating laser beam forms a plane defined by the first point, the second point and a position of the laser source.

The processor may be further programmed to establish predetermined gain and threshold values for detecting the reflected laser beam. The processor may be programmed even further to adjust at least one of the gain or threshold values if the target has not been detected for a predetermined period of time.

According to yet another aspect of the present invention, a laser transmitting system comprises a first target having a plurality of reflective sections and at least one non-reflective section with the first target being positioned at a first point having a predetermined angular orientation with respect to a first axis. A second target having a plurality of reflective sections and at least one non-reflective section is positioned at a second point having a predetermined angular orientation with respect to a second axis. A laser source is positioned at a third point corresponding to an intersection of the first and second axes and projects a rotating laser beam which is swept across the first target and the second target. A positioning device is coupled to the laser source and includes a first member and a second member for adjusting an angular orientation of the laser source with respect to the first axis and with respect to the second axis. A photodetecting system is coupled to the laser transmitting device for receiving a reflected laser beam from the first and second targets and generating first and second signals having first and second waveforms representative of the reflected laser beam from the first and second targets, respectively. The laser transmitting system includes a processor adapted to receive the first and second signals and programmed to control the first and second members of the positioning device in response to the first and second signals so that the rotating laser beam forms a plane defined by the first, second and third points.

The first waveform may include a first portion having a first duration corresponding to a time period when the laser beam traverses a first reflective section of the first target and a second portion having a second duration corresponding to a time period when the laser beam traverses a second reflective section of the first target. The second waveform may include a third portion having a third duration corresponding to a time period when the laser beam traverses a third reflective section of the second target and a fourth portion having a fourth duration corresponding to a time period when the laser beam traverses a fourth reflective section of the second target. The first member is adjusted until a first ratio of the first duration to the second duration substantially equals a first value and the second member is adjusted until a second ratio of the third duration to the fourth duration substantially equals a second value. Preferably, the first value substantially equals the second value.

The first waveform may include a first portion having a first duration corresponding to a time period when the laser beam traverses a first reflective section of the first target and a second portion having a second duration corresponding to a time period when the laser beam traverses a second reflective section of the first target. The second waveform may include a third portion having a third duration corresponding to a time period when the laser beam traverses a third reflective section of the second target and a fourth portion having a fourth duration corresponding to a time period when the laser beam traverses a fourth reflective section of the second target. The first member is adjusted until a first difference between the first and second durations substantially equals a first value and the second member is adjusted until a second difference between the third and fourth durations substantially equals a second value. Preferably, the first value substantially equals the second value.

According to yet another aspect of the present invention, a laser transmitting system comprises at least a first target having a plurality of reflective sections and at least one non-reflective section, a laser source for projecting a rotating laser beam in a plane which is swept across the first target, a positioning device coupled to the laser source, a photodetecting system receiving a reflected laser beam from the first target and generating a first signal having a first waveform representative of the reflected laser beam from the first target, and a processor. The positioning device includes a first member and a second member for adjusting an angular orientation of the laser source with respect to a first axis and with respect to a second axis. The processor is adapted to receive the first signal and programmed to control an indicator device in response to the first signal. The indicator device indicates a direction to rotate one of the first and second members of the positioning device so as to adjust the orientation of the plane of the rotating laser beam.

The laser transmitting system may further comprise a second target having a plurality of reflective sections and at least one non-reflective section. The processor may be adapted to receive the second signal and further programmed to control the indicator device in response to the second signal so that the indicator device indicates a direction to rotate the other of the first and second members of the position mechanism so as to adjust the orientation of the plane of the rotating laser beam.

The first target may be positioned at a first point, the second target may be positioned at a second point, and the laser source may be positioned at a third point so that the orientation of the plane of the rotating laser beam corresponds to a plane defined by the first, second and third points.

Other objects and advantages of the invention will be apparent from the following description, the accompanying drawings and the appended claims.

BRIEF DESCRIPTION OF THE DRAWINGS

FIG. 2 is a schematic view of the laser transmitter of FIG. 1;

FIG. 3 is a front view of a target according to the present invention;

FIG. 4 is a schematic view of the laser transmitter of FIG. 1 in a horizontal mode of operation;

FIG. 5 is a schematic view of the laser transmitter of FIG. 1 in a vertical mode of operation;

FIG. 9 is a waveform of a carrier oscillation portion of the waveform of FIGS. 6A, 7A and 8A;

FIGS. 13–23 are flow charts of a plane lock routine of the present invention.

DETAILED DESCRIPTION OF THE INVENTION

Figure 1:
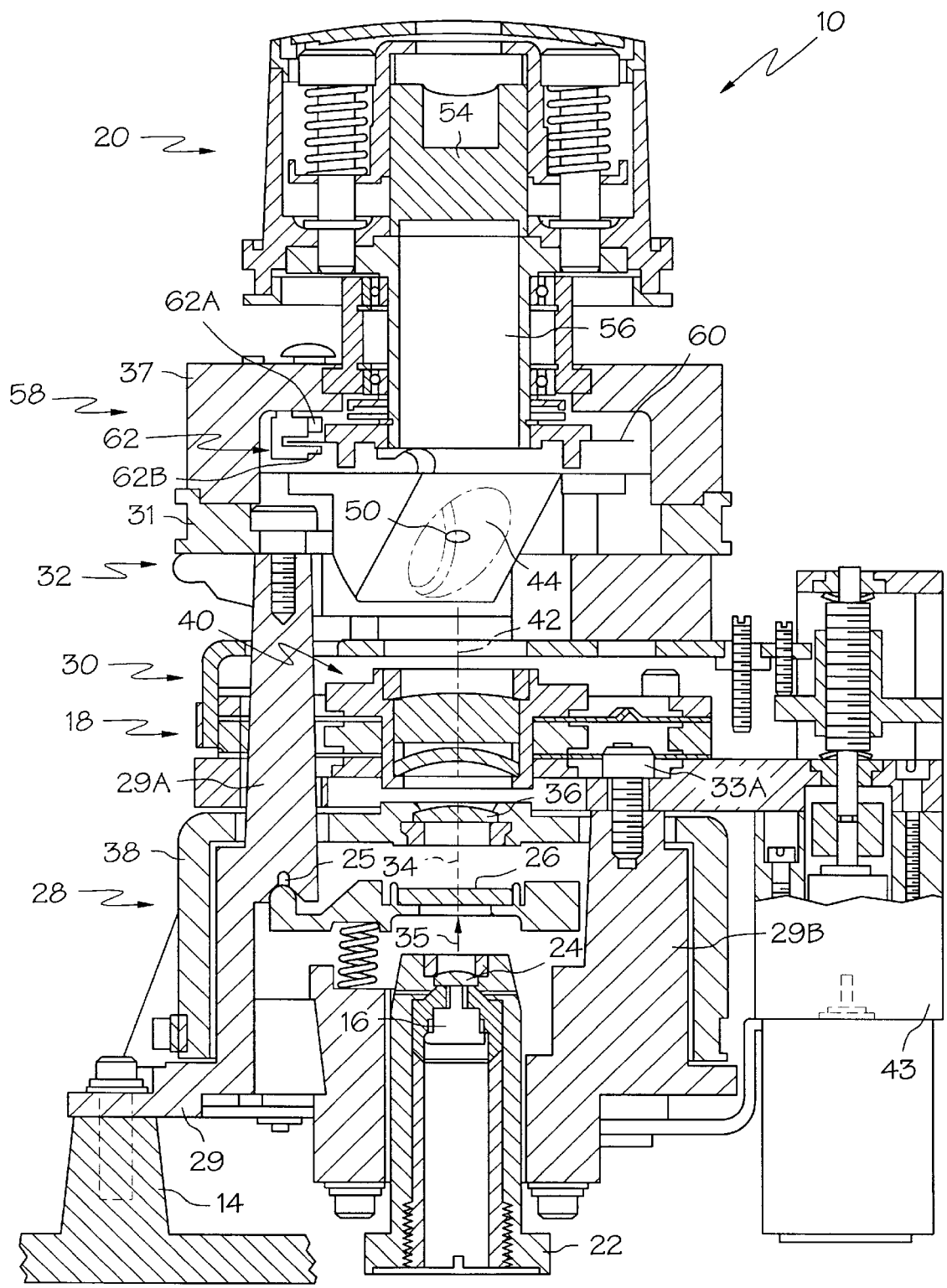
FIG. 1 is a cross-sectional view of a laser transmitter according to the present invention.

Referring now to FIGS. 1 and 2, a laser transmitter 10 for transmitting a beam of laser light 12 is shown. The laser transmitter 10 includes a housing 14, a light source 16, an optical assembly 18 and an optical projecting device 20. The light source 16 is coupled to an assembly 22. According to the illustrated embodiment, the light source 16 is a laser diode which generates the beam of laser light 12. The assembly 22 includes a collection lens 24 that is positioned above the light source 16. The collection lens 24 serves to collect the laser beam 12 and project it in a direction 35. Preferably, the collection lens 24 is a planar convex lens which collimates the laser beam 12.

The optical assembly 18 includes a flat window 26, a compensator assembly 28, a focusing mechanism 30 and a photodetecting system 32. The compensator assembly 28 includes an optics frame 29, a compensator cup 38 and a wire clamp ring 31. The optics frame 29 is coupled to and supported by the housing 14. The assembly 22 is coupled to the optics frame 29. The flat window 26 is positioned above the collection lens 24, and is pivotally coupled to the optics frame 29 through a spherical pivot 25. The flat window 26 tilts along an X-axis and a Y-axis using two calibration screws (not shown). The position of the flat window 26 is finely adjusted by the calibration screws so that the laser beam 12 is projected along a substantially vertical axis 34. The laser beam 12 will therefore be plumb when the optics frame 29 is positioned along a plane which is substantially parallel with respect to the plane of the ground, i.e. substantially level. A plumb beam of light is light which is projected substantially vertically with respect to the ground. The laser beam 12 is projected in the direction 35 by the light source 16 and the collection lens 24 and made plumb along the first axis 34 through the flat window 26. It should be apparent that the laser beam 12 will be plumb as long as the optics frame 29 is substantially level with respect to the ground.

The compensator assembly 28 optically adjusts the position of the laser beam 12 so that it is plumb even when the optics frame 29 is not substantially level. The compensator assembly 28 includes a compensating lens 36 mounted in the center of the compensator cup 38. The compensator cup 38 is positioned above the flat window 26 and swings freely on three wires (not shown) which are attached to the wire clamp ring 31. The wire clamp ring 31 is coupled to the optics frame 29 through three posts (only one post 29a shown). The compensator cup 38 is free to move when the compensator cup 38 is level within 12 minutes. As long as the compensator cup 38 is within 12 minutes of level, the compensating lens 36 may translate along the X and Y axes and optically adjust the position of the laser beam 12 so that it is plumb as it emerges from the compensator cup 38. The housing 14 is provided within an automatic or manual leveling device (not shown) to place the compensator assembly 28 within 12 minutes of level. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 26 and the compensator assembly 28 function to project the laser beam 12 along the first axis 34, either singularly or in tandem. The laser transmitter 10 also includes a solenoid (not shown) for locking the compensator cup 38 into a fixed position. Locking the compensator cup 38 into a fixed position enables the laser beam 12 to be projected from the laser transmitter 10 in orientations other than substantially level with respect to the ground.

The focusing mechanism 30 is positioned above the compensator cup 38 and is coupled to the optics frame 29 through three small posts (only one small post 29b shown) by three fasteners (only one fastener 33 shown). The three posts 29a of the optics frame 29 pass through the focusing mechanism 30 so that the focusing mechanism 30 does not contact the compensator cup 38. The focusing mechanism 30 includes a focusing lens 40 which is translated along the first axis 34 to adjust the focus of the laser beam 12. The focusing mechanism 30 is positioned so that the first axis 34 coincides with an optical axis 42 of the focusing lens 40. A plumb beam of laser light 12 is focused by the focusing mechanism 30. The focusing mechanism 30 includes a focus motor 43 coupled to the focusing lens 40. The focus motor 43 is adapted to change the position of the focusing lens 40 thereby adjusting the focus of the laser beam 12. In the illustrated embodiment, the near focus point of the laser beam 12 is approximately 10 feet while the far focus point is approximately near infinity. The focusing mechanism 30 is described in detail in copending application, U.S. Ser. No. 08/834,473, FOCUSING MECHANISM USING A THIN DIAPHRAGM, filed Apr. 11, 1997, by Hayes, herein incorporated by reference.

The wire clamp ring 31 is positioned above the focusing mechanism 30. The wire clamp ring 31 is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser transmitter 10.

The photodetecting system 32 is coupled to the optics frame 29 and is positioned above the focusing mechanism 30. As shown in FIG. 2, the photodetecting system 32 includes a reflector 44, a lens 45, a photodetector 46 and a detector circuit 48. The reflector 44 includes an aperture 50 positioned along optical axis 42; see also FIG. 1. The aperture 50 is sized to pass the laser beam 12. The reflector 44 also includes a reflective surface 44a to reflect returned light to the photodetector 46.

Referring to FIGS. 1 and 2, the optical projecting device 20 is coupled to the wire clamp ring 31 through a mounting ring 37. The optical projecting device includes a motor (not shown) and a pentaprism 54 within a spindle 56. The optical projecting device 20 is positioned above the focusing mechanism 30 to deflect the laser beam 12 ninety degrees with respect to vertical. The pentaprism 54 is a structure which deflects incoming light at a ninety degree angle with respect to the vertical regardless of the incident angle of the light on the pentaprism 54. Consequently, the incoming light does not have to hit the pentaprism 54 at an exact location in order to be deflected ninety degrees. The pentaprism 54 is rotated within the spindle 56 by the motor at a speed of approximately 50 rpm to define a substantially horizontal plane of light. A speed of 50 rpm is well suited for visible perception of the laser light 12 by the user. However, as will be appreciated by those skilled in the art, the pentaprism 54 may be rotated at any reasonable speed without departing from the scope of the present invention. While a pentaprism is used in the illustrated embodiment to deflect the incoming light, other light deflecting devices, such as a pentamirror, mirror, prism, reflector or refractor may also be used.

The optical projecting device 20 also includes an optical rotary encoder 58. The optical rotary encoder 58 includes an encoder disc 60 and a read head 62. The encoder disc 60 has graduations around the periphery of the disc which are read by the read head 62. The read head 62 includes an optical source 62A and an optical detector 62B. The encoder disc 60 is positioned between the optical source 62A and the optical detector 62B so that as the encoder disc 60 rotates, the read head 62 generates a signal representative of the position of the encoder disc 60, and hence the pentaprism 54. As is well known in the art, the encoder disc 60 may contain graduations which are spaced in a manner so that each position around the disc is uniquely referenced. Alternatively, in the illustrated embodiment, the encoder disc 60 contains a reference mark graduation (not shown) and a number of equally spaced graduations so that the position around the encoder disc 60 is referenced to the reference mark graduation.

Referring now to FIGS. 2 and 3, a target 64 is placed at the desired location. According to the illustrated embodiment as shown in FIG. 3, the target 64 comprises three sections, 64A, 64B, 64C. The target 64 includes a first reflective section 64A, a second reflective section 64C, and a non-reflective section 64B positioned between the first and second reflective sections 64A, 64C. In the illustrated embodiment, the first and second reflective sections 64A, 64C are composed of reflective materials while the non-reflective section 64B is composed of a non-reflective material.

The target 64 includes a first target region 64D, a second target region 64E and a third target region 64F. The width of the non-reflective section 64B is substantially constant in each of the target regions 64D–64F. In the first target region 64D, a first width or dimension of the first reflective section 64A is greater than a second width or dimension of the second reflective section 64C. Similarly, in the third target region 64F, the second dimension of the second reflective section 64C is greater than the first dimension of the first reflective section 64A. In the second target region 64E, the non-reflective section 64B slopes across the first and second reflective sections 64A, 64C such that in a first direction 66 the first dimension decreases with a proportional increase of the second dimension. In the illustrated embodiment, the first dimension substantially equals the second dimension substantially in the center 64G of the target 64. It will be appreciated by those skilled in the art that the target 64 may comprise more than three total sections. A target having multiple reflective and non-reflective sections may be used for greater accuracy without departing from the scope of the present invention.

It should be apparent that the target 64 should be comprised of alternating reflective and non-reflective sections with at least two reflective sections and at least one non-reflective section positioned therebetween. The orientation of the plane as defined by the rotating laser beam 12 is adjusted by detecting the light reflected from the target 64. The photodetecting system 32 is designed to detect light which is reflected from the reflective sections 64A, 64C of the target 64 such that the first and last sections should be reflective. It will be appreciated by those skilled in the art that if the first and/or last section is non-reflective, such non-reflective sections would be irrelevant for the purposes of the present invention as the photodetecting system 32 would not be able to distinguish the first or last non-reflective section from the surrounding environment. The photodetecting system 32 is only able to detect a non-reflective section if the non-reflective section is surrounded by reflective sections. In the illustrated embodiment, the target 64 is comprised of a single integral unit including sections 64A, 64B and 64C. However, the target 64 may be comprised of discrete first and third reflective sections 64A and 64C coupled together with an empty space between them representing the non-reflective second section 64B. Further, the target 64 may comprise separate and distinct sections 64A, 64B and 64C which are positioned a set distance from each other, or separate and distinct reflective sections 64A, 64C separated a set distance from each other.

Figure 10:
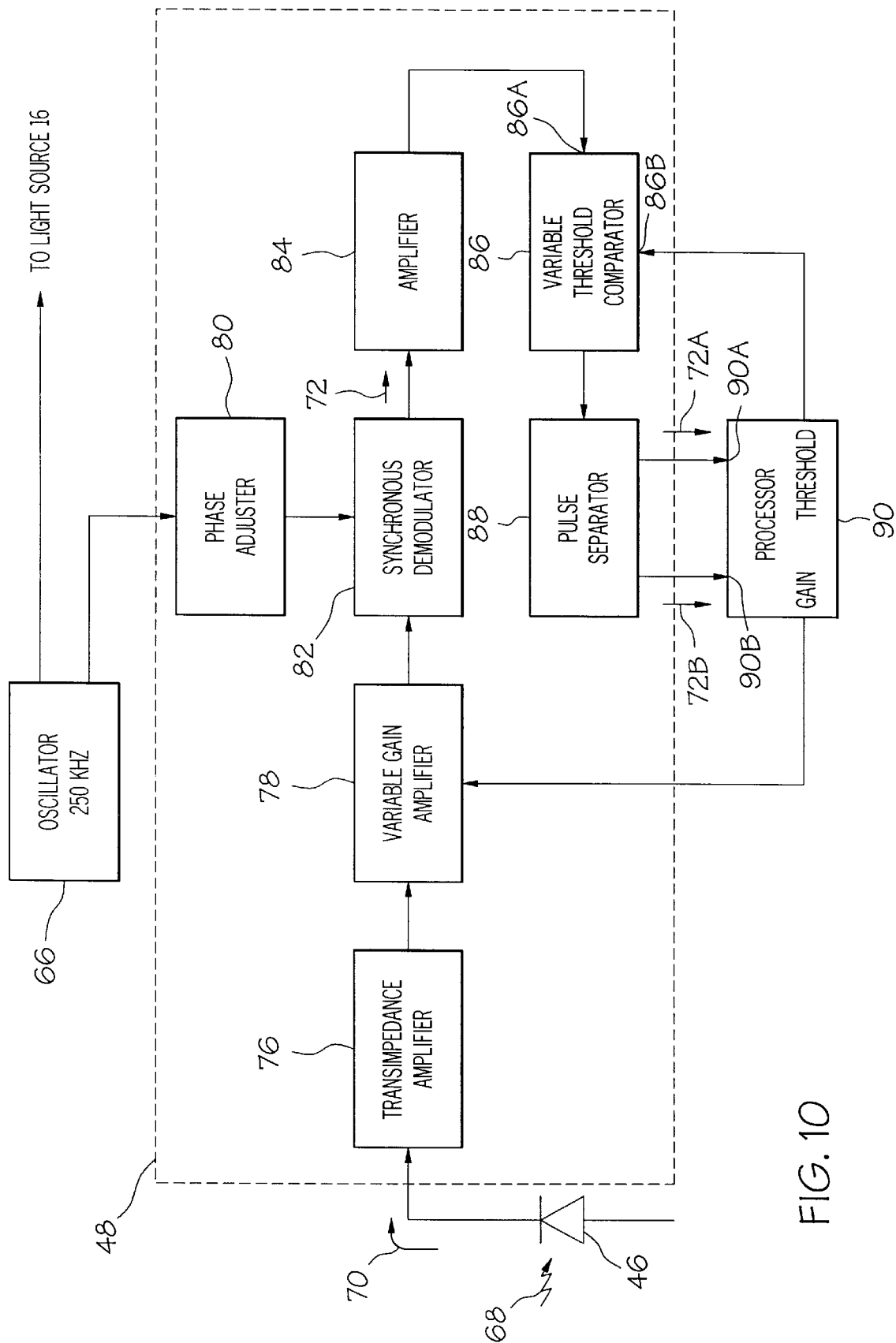
FIG. 10 is a schematic diagram of a detector circuit of the laser transmitter of FIG. 1.

During plane lock in which the rotating laser beam 12 is adjusted until it defines a desired plane, the laser beam 12 is modulated by an oscillator 66 which supplies power to the light source 16, as shown in FIG. 10. The laser beam 12 is modulated to distinguish the laser beam 12 from other light sources, such as any of the numerous other ambient light sources. Preferably, the oscillator 66 generates a 250 KHz carrier oscillation signal. It will be appreciated by those skilled in the art that other frequencies may be used to modulate the laser beam 12. It should be further appreciated by those skilled in the art that the laser beam 12 may be transmitted without any modulation. As shown in FIG. 2, the modulated laser beam 12 is swept across the target 64. In the illustrated embodiment of FIG. 3, the laser beam 12 is swept across the target 64 generally perpendicular to the first direction 66 as represented by laser beam trace 12A. However, it should be apparent that the laser beam 12 may be swept across the target 64 having orientations other than generally perpendicular to the first direction 66 since the configuration of the target 64 with the sloped non-reflective section 64B produces proportionate changes in the length of time in which the laser beam 12 traverses each section 64A, 64B, and 64C of the target 64. For example, if the laser beam 12 is tilted as represented by laser beam trace 12B, the length of time in which the laser beam 12 traverses the first reflective section 64A increases in the same proportion as the length of time in which the laser beam 12 traverses the second reflective section 64C. As the changes in length of time the laser beam 12 traverses each section 64A, 64B and 64C is directly proportional to orientation of the laser beam 12 across the target 64, the laser beam 12 may be swept across the target 64 with orientations other than generally perpendicular to the first direction without departing from the scope of the present invention.

A reflected beam of laser light 68 is reflected back towards the laser transmitter 10. For clarity and ease of description, the reflected beam of laser light 68 has been given a separate designation from the laser beam 12 even though they are the same beam. The reflected beam of laser light 68 consists of two pulses of light each time the laser light 12 is reflected from the first and second reflective sections 64A, 64C of the target 64. The reflected light 68 is received by the pentaprism 54 and reflected towards the reflector 44. The reflected light 68 is then reflected by the reflective surface 44a of reflector 44 and focused by the lens 45 onto the photodetector 46.

Figure 6A:
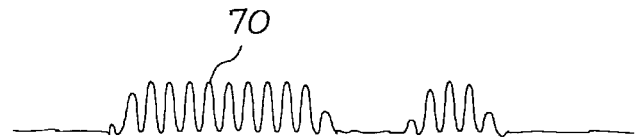
FIG. 6A is a waveform representative of modulated light reflected from a first target region of the target of FIG. 3.
Figure 6B:
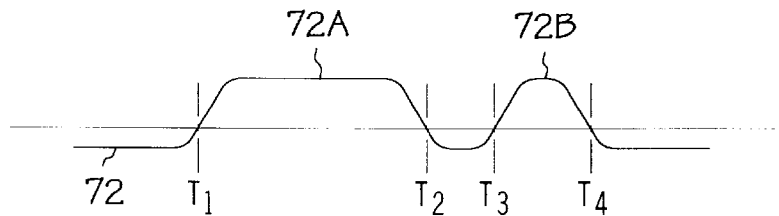
FIG. 6B is a waveform of a data signal portion of the waveform of FIG. 6A.
Figure 7A:
FIG. 7A is a waveform representative of modulated light reflected from a second target region of the target of FIG. 3.
Figure 7B:
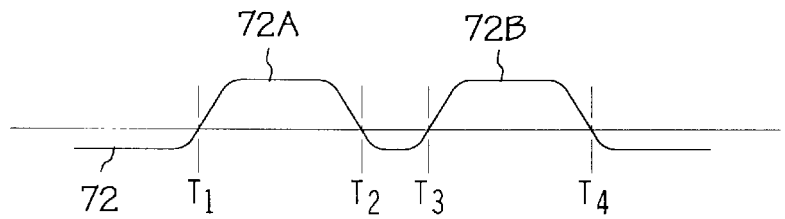
FIG. 7B is a waveform of a data signal portion of the waveform of FIG. 7A.
Figure 8A:
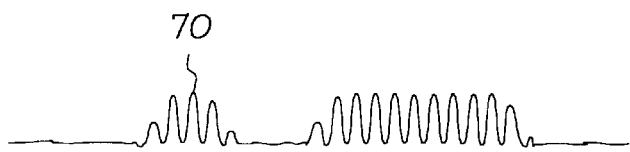
FIG. 8A is a waveform representative of modulated light reflected from a third target region of the target of FIG. 3.

As shown in FIGS. 6A, 7A and 8A, the photodetector 46 generates a signal 70 having a waveform representative of the reflected light 68 In the illustrated embodiment, the photodetector 46 is a PIN diode such that the signal 70 is in current form. The waveform comprises two pulses representative of the time periods in which the laser light 12 sweeps across the first and second reflective sections 64A, 64C of the target 64. The signal 70 is basically an amplitude modulated signal with a data signal portion 72 and the 250 Khz carrier oscillation signal portion 74 (see FIGS. 6B, 7B, 8B and 9). The signal 70 is transmitted to the detector circuit 48 as part of the plane lock routine.

Referring to FIG. 10, the detector circuit 48 includes a transimpedance amplifier 76, a variable gain amplifier 78, a phase adjuster 80, a synchronous demodulator 82, an amplifier 84, a variable threshold comparator 86 and a pulse separator 88. The photodetector 46 is coupled to the transimpedance amplifier 76. The transimpedance amplifier 76 converts the current form of the signal 70 generated by the photodetector 46 to a voltage form of the signal 70. The voltage form of the signal 70 is transmitted to the variable gain amplifier 78. In the illustrated embodiment, the variable gain amplifier 78 has a low gain mode and a high gain mode. The low gain mode is used when the target 64 is close to the laser transmitter 10 since more light is reflected back. The high gain mode is used when the target 64 is far from the laser transmitter 10 since less light is reflected back. The variable gain helps prevent the detector circuit 48 from saturating when an excessive amount of light is reflected back to the laser transmitter 10. It will be appreciated by those skilled in the art that the transimpedance amplifier 76 could be a variable gain transimpedance amplifier. It will be fully appreciated by those skilled in the art that the detector circuit 48 could be prevented from going into saturation by using a conventional clipping circuit.

Figure 8B:
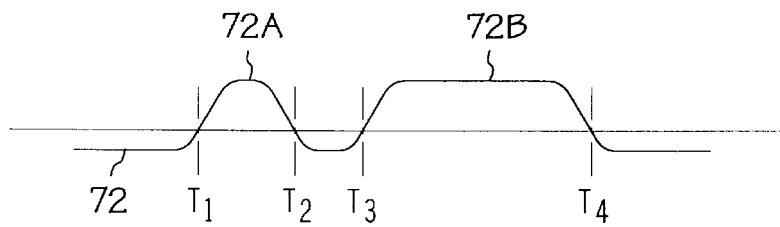
FIG. 8B is a waveform of a data signal portion of the waveform of FIG. 8A.

The phase adjuster 80 receives the carrier oscillation signal which was used to modulate the laser beam 12. The phase adjuster 80 adjusts the phase of the carrier oscillation signal to match the phase of the signal 70. The adjusted oscillation signal is fed to the synchronous demodulator 82 along with the signal 70 from the variable gain amplifier 78. The synchronous demodulator 82 separates the carrier oscillation signal portion 74 from the data signal portion 72. As shown in FIGS. 6B, 7B and 8B, the data signal portion 72 comprises a first pulse 72A and a second pulse 72B. The synchronous demodulator 82 outputs the data signal portion 72 which is then amplified by the amplifier 84.

The amplified data signal portion 72 is inputted into a first input 86A of the variable threshold comparator 86. A second input 86B of the variable threshold comparator 86 receives a threshold voltage which sets the threshold capability of the variable threshold comparator 86. A threshold voltage is used to filter out background noise that may be detected by the photodetector 46. The variable threshold comparator 86 outputs the portions of the amplified data signal portion 72 which exceed the voltage threshold as established by the second input 86B. As the laser beam 12 is swept across the reflective sections 64A, 64C, the data signal pulses 72A, 72B extracted by the detection circuit 48 should exceed the threshold voltage.

The threshold voltage may be adjusted based on the approximate distance between the target 64 and the laser transmitter 10. A lower threshold voltage may be set when a relatively weak signal is received while a higher threshold voltage may be set when a relatively strong signal is received. A stronger signal will be generated as the target 64 is moved closer to the laser transmitter 10.

The amplified data signal portion 72 outputted from the variable threshold comparator 86 is inputted into the pulse separator 88. The pulse separator 88 separates the two pulses 72A, 72B into separate component pulses, i.e. the first pulse 72A and the second pulse 72B. The first pulse 72A is transmitted to a first timer input 90A of a processor 90 while the second pulse 72B is transmitted to a second timer input 90B of the processor 90. The processor 90 includes an internal clock and an edge detector which establish the time interval in which a transition is made by each pulse 72A, 72B. As shown in FIGS. 6B, 7B and 8B, the first transition is set as $T_1$, the second transition is set as $T_2$, the third transition is set as $T_3$ and the fourth transition is set as $T_4$.

The first time period $TP_1$ ($T_2-T_1$), represents the duration of time in which the laser beam 12 sweeps across the first reflective section 64A of the target 64. The second time period or deadband period $TP_2$ ($T_3-T_2$), represents the duration of time in which the laser beam 12 sweeps across the non-reflective section 64B of the target 64. The third time period $TP_3$ ($T_4-T_3$), represents the duration of time in which the laser beam 12 sweeps across the second reflective section 64C of the target 64. The processor 90 is programmed to analyze the time periods in order to adjust the orientation of the rotating laser beam 12 so that it produces a plane which substantially intersects the center 64G of the target 64.

The processor 90 is programmed to adjust the orientation of the laser beam 12 so that the rotating laser beam 12 forms a plane which substantially intersects the center 64G of the target 64. The processor 90 may be programmed to adjust the orientation of the rotating laser beam 12 in a number of different ways based on the measured time periods $TP_1$, $TP_2$ and $TP_3$. As shown in FIG. 7B, the rotating laser beam 12 forms a plane which substantially intersects the center 64G of the target 64 when the pulses 72A and 72B are substantially equal. Accordingly, the ratio of the first time period $TP_1$ to the third time period $TP_3$ will substantially equal one when the rotating laser beam 12 forms a plane which substantially intersects the center 64G. Similarly, the difference of the first and third time periods $TP_1$ and $TP_3$ may be used to determine the proper orientation as the difference substantially equals zero at the center 64G. It will be appreciated by those skilled in the art that other methods may be used to adjust the orientation of the laser beam 12 based on the measured time periods $TP_1$, $TP_2$ and $TP_3$.

The ratio or difference of the first and third time periods $TP_1$ and $TP_3$ vary between two extremes as set by the first and third regions 64D and 64F. As shown in FIG. 6B, the first time period $TP_1$ is greater than the third time period $TP_3$ by a fixed set amount when the orientation of the rotating laser beam 12 forms a plane which traverses the first target region 64D. The ratio or difference of the first and third time periods $TP_1$ and $TP_3$ is one of the set extreme amounts such that the processor 90 is programmed to adjust the orientation of the rotating laser beam 12 downwards towards the second target region 64E. Similarly, as shown in FIG. 8B, the first time period $TP_1$ is less than the third time period $TP_3$ by a fixed set amount when the rotating laser beam 12 forms a plane which traverses the third target region 64F. The ratio or difference of the first and third time periods $TP_1$ and $TP_3$ is the other of the set extreme amounts such that the processor 90 is programmed to adjust the orientation of the rotating laser beam 12 upwards towards the second target region 64E. The first and third regions 64D and 64F are used to give the processor 90 an indication of the direction in which to adjust the rotating laser beam 12 so that the rotating laser beam 12 forms a plane which first traverses the second target region 64E and eventually substantially intersects the center 64G. It should be apparent to those skilled in the art that the processor 90 may be programmed to adjust the rotating laser beam 12 to other than the center 64G of the target 64. It will be further appreciated by those skilled in the art that the desired plane does not have to intersect the area in which the first dimension substantially equals the second dimension.

In the illustrated embodiment, the processor 90 is programmed so that the orientation of the rotating laser beam 12 may be quickly adjusted once the rotating laser beam 12 forms a plane which traverses the second target region 64E. The processor 90 is programmed to estimate a distance Z in which to adjust an angular position of the laser transmitter 10 so that the rotating laser beam 12 forms a plane which substantially intersects the center 64G of the target 64, and thus the desired plane.

As shown in FIG. 3, the rotating laser beam 12 may traverse the target 64 as represented by laser trace 12A. The distance Z to the center 64G may be estimated using the formula:

$$Z = m(X_1 - X_2)/2 \qquad (1)$$

where:

m defines the slope of the non-reflective section 64B;

$X_1$ defines the distance in the first reflective section 64A to the non-reflective section 64B; and $X_2$ defines the distance in the second reflective section 64C to the non-reflective section 64B.

The distances $X_1$ and $X_2$ may be calculated from the measured time periods $TP_1$ and $TP_3$ using the formulas:

$$X_1 = v^* TP_1 \qquad (2)$$

$$X_2 = v^* TP_3 \qquad (3)$$

where:

v defines the linear velocity of the rotating laser beam 12.

Substituting equations (2) and (3) in equation (1) yields:

$$Z = m^* v(TP_1 - TP_3)/2. \qquad (4)$$

The velocity v may be estimated from the angular velocity w of the rotating laser beam 12 and the distance R between the target 64 and the laser transmitter 12 using the formula:

$$v = w^* R. \qquad (5)$$

Substituting equation (5) in equation 4 yields:

$$Z = m^* w^* R(TP_1 - TP_3)/2. \qquad (6)$$

The number of radians θ in which to adjust the angular position of the laser transmitter 10 may be estimated using the formula:

$$\theta = Z/R. \qquad (7)$$

Substituting equation (6) in equation (7) yields:

$$\theta = m^* w(TP_1 - TP_3)/2. \qquad (8)$$

As shown in equation (8), the number of radians θ in which to adjust the angular position of the laser transmitter 10 may be estimated without having to calculate the distance R. However, the distance R is easily estimated based on the measured target width which is the sum of the three time periods $TP_1$, $TP_2$ and $TP_3$. With the distance Z or radians θ calculated, the processor 90 may be programmed to quickly control the orientation of the laser transmitter 10, and hence, the rotating laser beam 12, so that the rotating laser beam 12 forms a plane which substantially intersects the center 64G of the target 64.

The distance R may be estimated based on the total duration of the three time periods $TP_1$, $TP_2$ and $TP_3$ since the total duration is inversely proportional to the distance, i.e. shorter for longer distances and longer for shorter distances. The processor 90 includes a data table which sets the gain of the variable gain amplifier 78 and the voltage threshold of the variable threshold comparator 86 based on the estimated distance R. The data table is developed based on the target width and is accessed by the plane lock routine. The processor 90 is also programmed to adjust the gain and/or threshold of the detector circuit 48 if the target 64 has not been detected for a predetermined period of time in order to change the sensitivity of the detector circuit 48. The processor 90 expects to detect the target 64 when in autofocusing mode so that the gain and/or threshold is adjusted to increase the sensitively of the detector circuit 64 and the likelihood of detecting the target 58. The gain and/or threshold may be adjusted at any desired rate, i.e. after each revolution of the pentaprism 54.

The laser transmitter 10 may be placed in a horizontal position as shown in FIG. 4 or a vertical position as shown in FIG. 5. In either of the positions, the rotating laser beam 12 may be set to a desired planar orientation using one or two targets 64. As shown in FIG. 4, two targets 64 are used to define the plane in which the laser beam 12 is rotated. The first target $64_1$ is positioned at a first point 92 having a predetermined angular orientation with respect to an X or first axis 94 and the second target $64_2$ is positioned at a second point 96 having a predetermined angular orientation with respect to a Y or second axis 98. In the illustrated embodiment, the first axis 94 is substantially orthogonal to the second axis 98. However, it will be appreciated by those skilled in the art, that the first and second axes 94, 98 may be positioned at other angular relationships with respect to each other. The laser transmitter 10 is positioned at a third point 100 which corresponds to the intersection of the first and second axes 94, 98. The plane in which the laser beam 12 is rotated is defined by the first, second and third points 92, 96 and 100. The first and second axes 94, 98 are defined by the laser transmitter 10 such that the first and second points 92, 96 are referenced with respect to the laser transmitter 10. In the illustrated embodiment, the first and second points 92, 96 are aligned within plus or minus five (5) degrees of the appropriate axis 94, 98. In operation, the first and second targets $64_1$, $64_2$ are positioned approximately along the first and second axes 94, 98 as defined by the laser transmitter 10.

The laser beam 12 is swept across both of the targets $64_1$, $64_2$ and signals 70 representative of the laser beam 12 reflected from each of the targets $64_1$, $64_2$ are detected by the photodetecting system 32. The processor 90 is programmed so that the laser transmitter 10 is adjusted about the first axis 94 in response to the signal 70 generated by the reflected light 68 from the first target $64_1$ and about the second axis 98 in response to the signal 70 generated by the reflected light 68 from the second target $64_2$. The targets $64_1$, $64_2$ do not have to be separated by exactly 90 degrees as the processor 90 is programmed to set one target 64 as corresponding to the first axis 94 within plus or minus five (5) degrees and the other target 64 as corresponding to the second axis 98 within plus or minus five (5) degrees. The angular position of each of the targets $64_1$, $64_2$ about the laser transmitter 10 is determined by the rotary encoder 58. The position of the pentaprism 54, and hence, the corresponding target 64 is determined by the rotary encoder 58 as soon as the reflected light 68 is detected by the photodetecting system 32. Once the position of each of the targets 64$_1$, 64$_2$ is determined with respect to the axes 94, 98, the processor 90 establishes a reference system for adjusting the position of the laser transmitter 10.

It should be apparent that one target 64 may be used to establish the desired plane for the rotating laser beam 12. The laser transmitter 10 is leveled with respect to one of the axes, i.e. second axis 98, using a leveling vial (not shown) coupled to the laser transmitter 10. Once the laser transmitter 10 is level with respect to the second axis 98, the angular orientation of the laser transmitter 10 is adjusted with respect to the first axis 94 so that the rotating laser beam 12 intersects the first target 64$_1$ positioned at the first point 92. The rotating laser beam 12 therefore forms a plane defined by the first point 92, the third point 100 and the second axis 98.

As shown in FIG. 5, one target 64 is used to adjust the orientation of the rotating laser beam 12. The orientation of the laser transmitter 10 is adjusted so that the laser transmitter 10 is level with respect to the second axis 98. It should be noted that the first and second axes 94, 98 are merely rotated ninety degrees from the position as shown in FIG. 4. A leveling vial (not shown) is used to level the laser transmitter 10 with respect to the second axis 98. The orientation of the laser transmitter 10 is then adjusted so that the rotating laser beam 12 forms a plane defined by the target 64, the position of the laser transmitter 10 and the second axis 98. It will be appreciated by those skilled in the art that two targets 64 may be used to orient the rotating laser beam 12 to the desired plane as described with respect to FIG. 4. It will be further appreciated by those skilled in the art that the laser transmitter 10 may be offset a predetermined number of degrees from the second axis 98 and thus form a desired plane defined by the position of the one target 64, the position of the laser transmitter 10 and the offset of the laser transmitter 10 with respect to the second axis 98.

Figure 11:
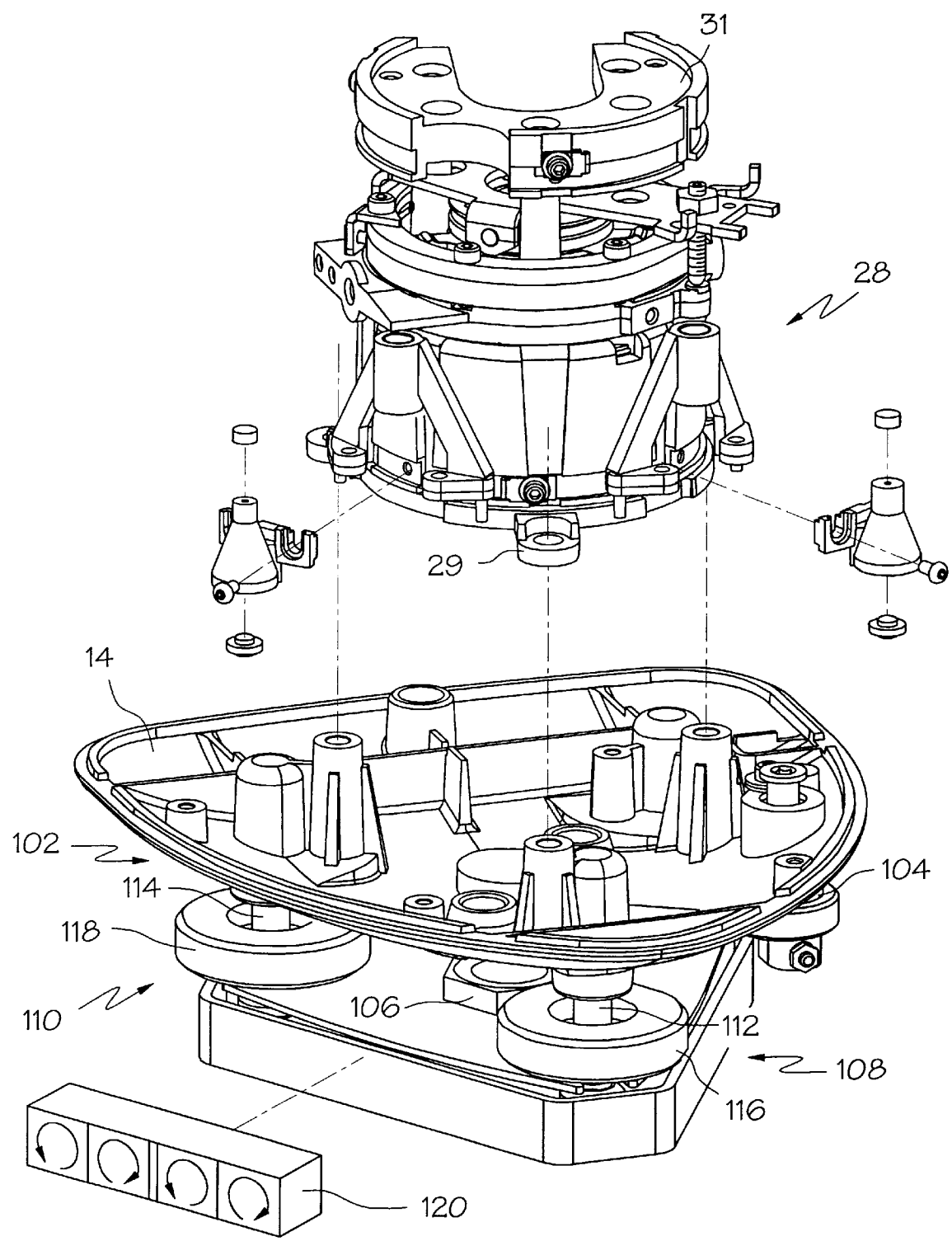
FIG. 11 is a perspective view of a positioning device according to one embodiment of the present invention.

The orientation of the laser transmitter 10 with respect to the first and second axes 94, 98 may be adjusted manually or automatically. According to one embodiment of the present invention, the processor 90 is programmed to control a positioning device 102 which is coupled to the housing 14 through a pivot joint 104; see FIG. 11. The positioning device 102 is coupled to a tripod (not shown) through a mounting device 106. The positioning device 102 comprises a first member or a first positioning device 108 and a second member or a second positioning device 110. The first and second positioning devices 108, 110 adjust the position of the housing 14 and hence the rotating laser beam 12, with respect to the first and second axes 94, 98. The position of the housing 14, and hence, the laser transmitter 10 changes with respect to the positioning device 102, and hence, with respect to the first and second axes 94, 98. The first positioning device 108 includes a first adjustable screw 112 while the second positioning device 110 includes a second adjustable screw 114. Rotation of the adjustable screws 112, 114 causes the housing 14 to pivot about pivot joint 104, thereby adjusting the position of the housing 14 and the laser transmitter 10 with respect to the first and second axes 94, 98. The adjustable screws 112, 114 may be rotated manually via a first knob 116 and a second knob 118. The processor 90 controls an indicator device 120 which instructs the operator which knob 116, 118 to turn and in which direction. The indicator device 120 may comprise a set of light emitting diodes or a display device which indicates the direction in which to adjust the position of the housing 14 and the laser transmitter 10. The processor 90 controls the indicator device 120 until the rotating laser beam 12 forms a plane which intersects the center 64G of one or two targets 64.

Figure 12:
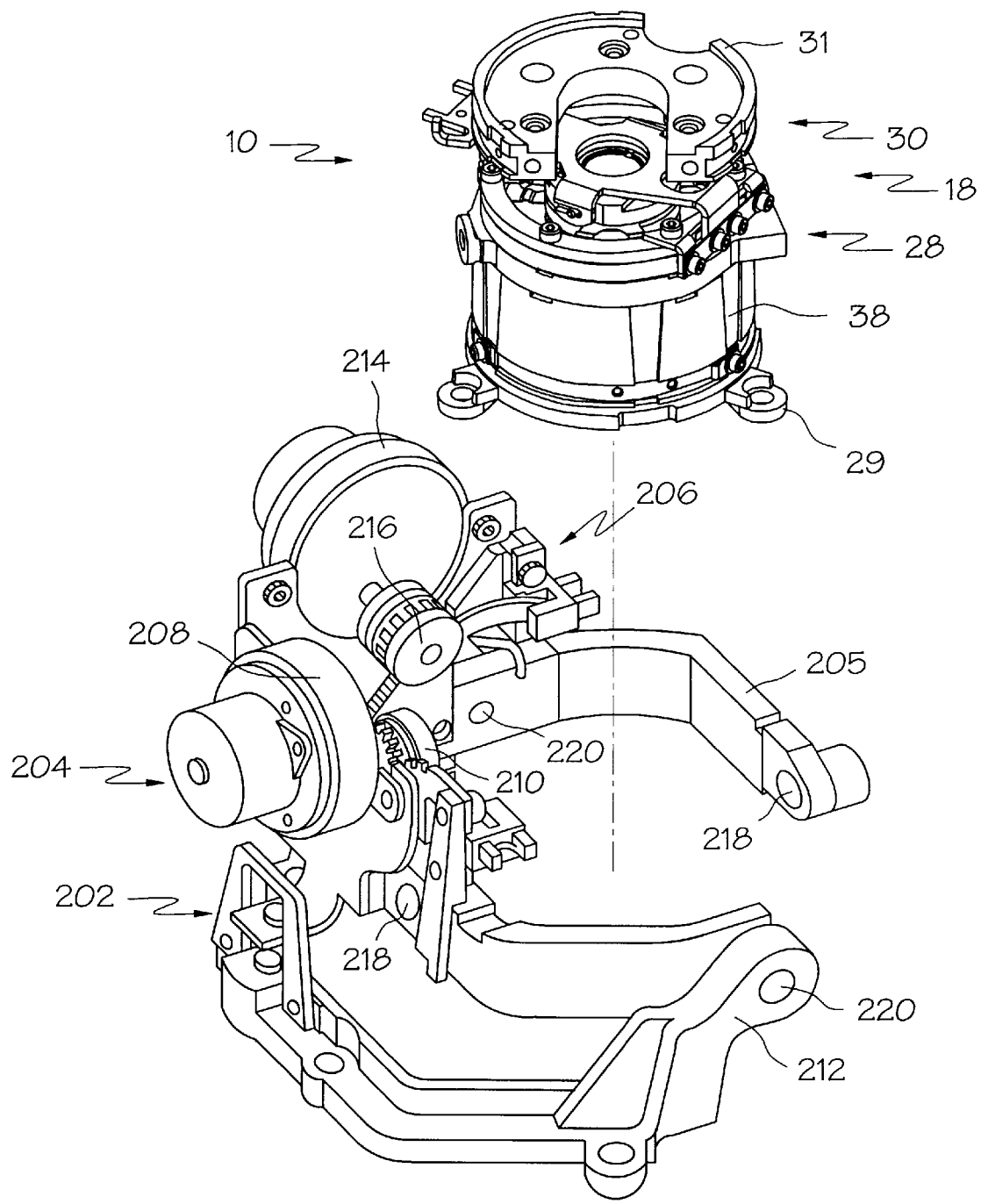
FIG. 12 is a perspective view of a positioning device according to another embodiment of the present invention.

The orientation of the laser transmitter 10, and hence the rotating laser beam 12, may be adjusted directly and automatically according to another embodiment of the present invention. A positioning device 202 is shown in FIG. 12. The positioning device 202 includes a first member 204 for adjusting the position of the laser transmitter 10, and hence the rotating laser beam 12, with respect to the first axis 94, and a second member 206 for adjusting the position of the laser transmitter, and hence the rotating laser beam 12, with respect to the second axis 98. The first member 204 includes an inner gimbal mechanism 205, a first axis motor 208, and a first axis gearing mechanism 210. The second member 206 includes the inner gimbal mechanism 205, an outer gimbal mechanism 212, a second axis motor 214, and a second axis gearing mechanism 216. The compensator assembly 28 is rotatably coupled to the inner gimbal mechanism 205 through mutually opposing pivot joints 218. The outer gimbal mechanism 212 is rotatably coupled to the inner gimbal mechanism 205 through mutually opposing pivot joints 220. The outer gimbal mechanism 212 is mounted to a mounting device (not shown) through mounting posts (not shown). The outer gimbal mechanism 212 is fixed while the compensator assembly 28 is suspended from the inner gimbal mechanism 205.

The first axis motor 208 is coupled to the inner gimbal mechanism 205 and to the compensator assembly 28 through the first axis gearing mechanism 210. The first axis motor 208 effectuates rotation of the first axis gearing mechanism 210 which causes rotation of the compensator assembly 28 within the inner gimbal mechanism 205 and about the first axis 94. The second axis motor 214 is coupled to the outer gimbal mechanism 212 and to the inner gimbal mechanism 205 through the second axis gearing mechanism 216. The second axis motor 214 effectuates rotation of the second axis gearing mechanism 216 which causes rotation of the inner gimbal mechanism 205 about the second axis 98. The compensator assembly 28 and the laser transmitter 10 rotate about the second axis 98 with the inner gimbal mechanism 205. The first axis motor 208 rotates with the inner gimbal mechanism 205 while the second axis motor 214 remains fixed to the outer gimbal mechanism 212. The processor 90 is programmed to control the first and second axis motors 208, 214 until the rotating laser beam 12 forms a plane which intersects the center 64G of one or two targets 64.

In the illustrated embodiment, the first and second axis motors 208, 214 are stepper motors. The processor 90 estimates the number of steps in which to move the first and second axis motors 208, 214 using the formula:

$$NS = \theta/k \tag{9}$$

where:

k defines the angular movement of the motors per step.
Substituting equation (8) in equation (9) yields:

$$NS = (m^* w(TP_1 - TP_3)/2)/k. \tag{10}$$

Once the processor estimates the number of steps in which to move the motors 208, 214, the rotating laser beam 12 may define the desired plane quickly.

It will be appreciated by those skilled in the art that the manual and automatic plane lock operations are not restricted to the disclosed positioning devices 102, 202. The angular position of the laser transmitter 10 may be automatically adjusted with respect to the housing 14 by replacing the first and second axis knobs 116, 118 with positioning motors controlled by the processor 90. Similarly, the angular position of the laser transmitter 10 may be manually adjusted with respect to the compensator assembly 28 by replacing the first and second axis motors 208, 214 with rotatable knobs and an indicator device 120 as disclosed above. It will be further appreciated that other positioning devices controlled by the processor 90 may be used to adjust the position of the laser transmitter 10 without departing from the scope of the present invention. It should be apparent that the first and second axes 94, 98 of the laser transmitter 10 are defined by the configuration of the positioning device 102, 202 as the angular orientation of the laser transmitter 10 with respect to the first and second axes 94, 98 is adjusted by the positioning device 102, 202. It will be appreciated by those skilled in the art that the first and second members may be aligned in such a manner so that the position of the laser transmitter 10 is adjusted without the first and second members being directly aligned with the first and second axes 92, 98, respectively.

The length of time it takes to adjust the rotating laser beam 12 to the desired plane is directly proportional to the rate at which the laser beam 12 is swept across the target 64. The rate may be increased by dithering the laser beam 12 across the target 64. The laser beam 12 is dithered by sweeping the laser beam 12 back and forth across the target 64 once the target 64 is detected, reversing the direction of the beam rotation after each sweep. More data is transmitted to the photodetecting system 32 by this technique since the laser beam 12 does not have to rotate a full 360 degrees. The amount of data transmitted to the photodetecting system 32 increases without having to increase the rotational speed of the pentaprism 54. However, it will be appreciated by those skilled in the art that the rotational speed of the pentaprism 54 may be reasonably increased to reduce adjustment time, as well. The laser beam 12 may also be dithered across two targets 64 with the laser beam 12 reversing direction after both targets 64 are detected.

Figure 13:
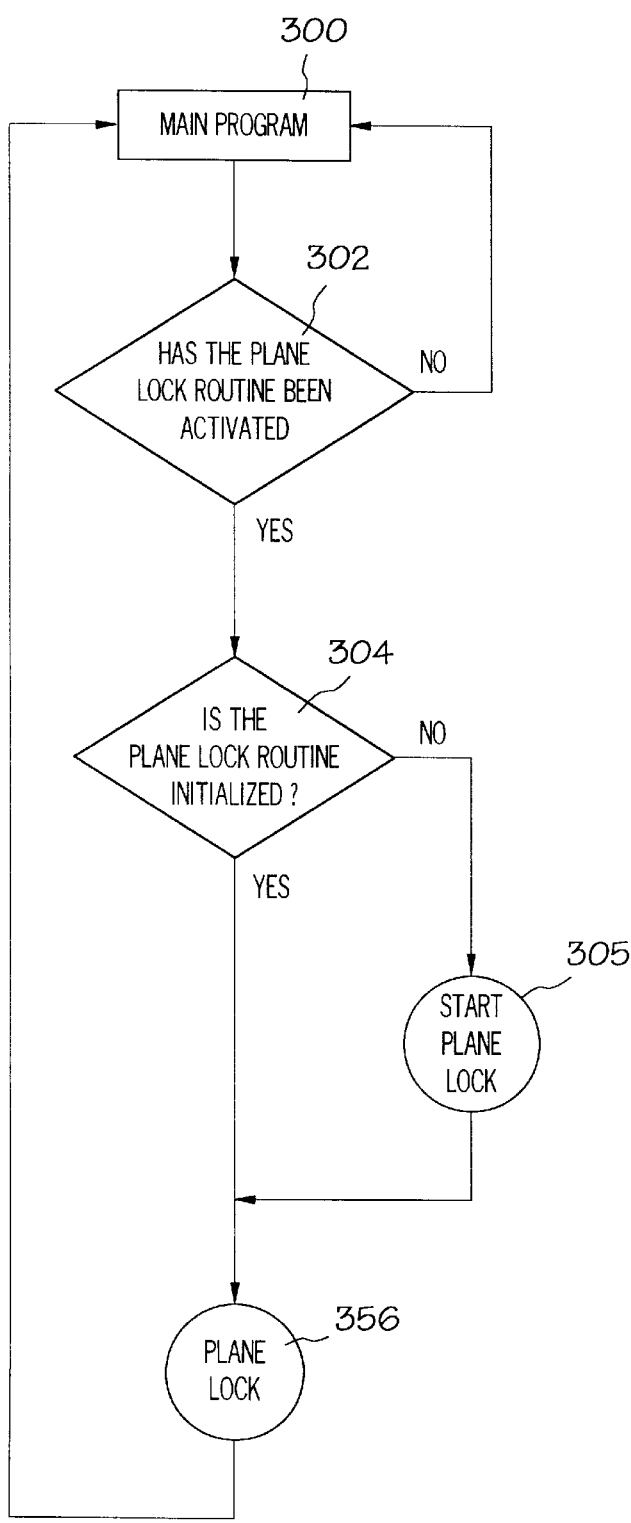

Referring to the flow charts of FIGS. 13–23, the plane lock routine will be described in detail. The main program routine 300 for the laser transmitter 10 is shown in FIG. 13. The main routine 300 controls the laser transmitter 10 during normal operation until the plane lock mode is activated. Block 302 is a decision block which monitors the main routine 300 for plane lock activation. If plane lock is not activated, the program returns to the main routine 300. If plane lock is activated, the program determines if the plane lock routine is initialized in decision block 304. If the plane lock routine is not initialized, the program executes the start plane lock subroutine 305. If the plane lock routine is initialized, the plane lock subroutine 356 is executed. Similarly, once the start plane lock subroutine 305 is executed, the plane lock subroutine 356 is executed. After the plane lock subroutine 356 is executed, the program returns to the main routine 300 for normal laser operation if the plane lock mode is deactivated or plane lock is continued if the plane lock mode is still activated.

Figures 17, 18:
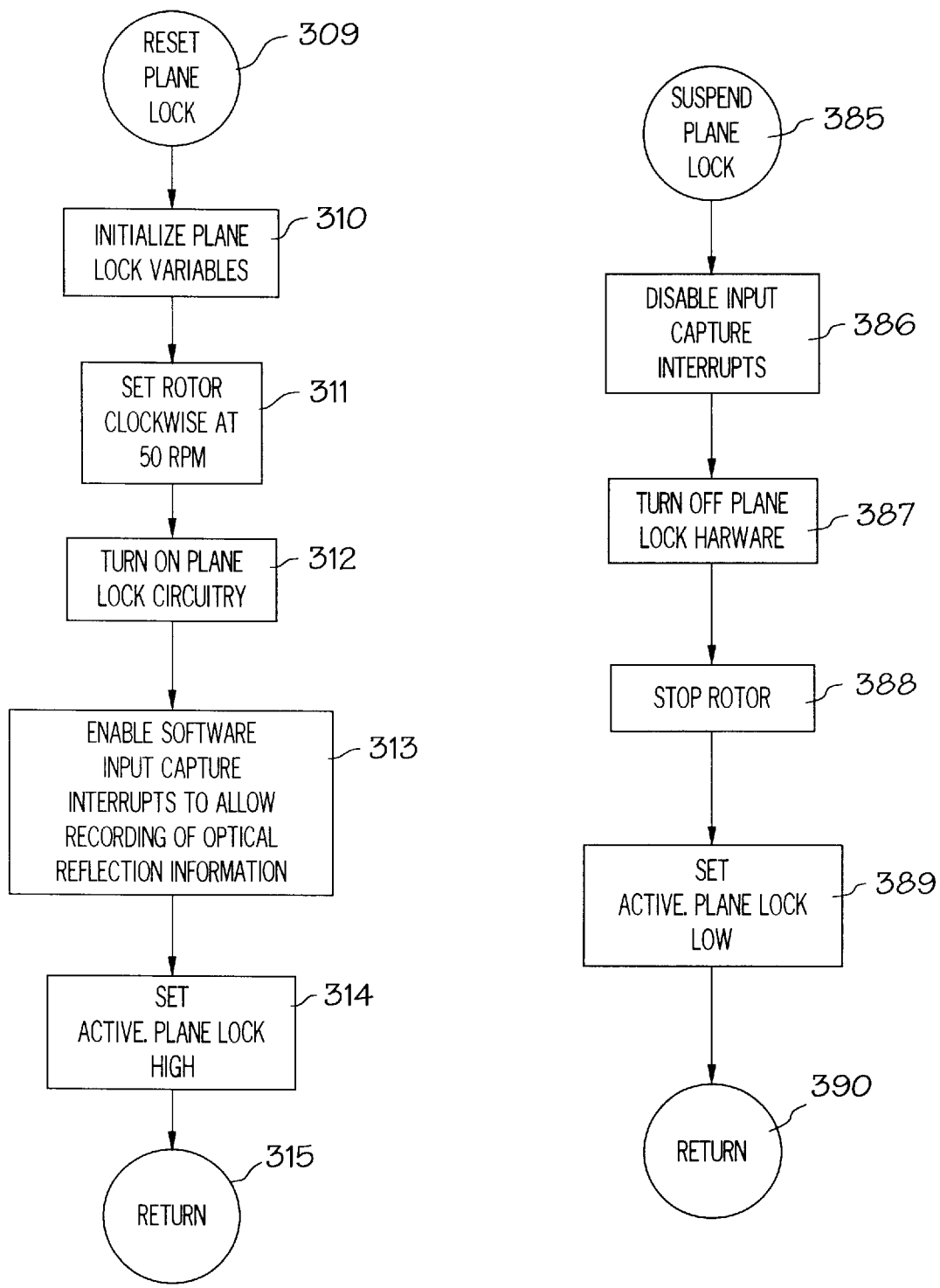

The start plane lock subroutine 305 is shown in FIG. 15. The first block of the plane lock subroutine 305 calls the initialize plane lock subroutine in block 306 which is shown in FIG. 16. The first block of the initialize plane lock subroutine 306 causes the focusing mechanism 30 to run towards infinity focus in block 307 for better resolution and better visibility so as to increase the maximum range for detecting the target 64. The solenoid is activated in block 308 to lock the compensator cup 38 in place so that the plane lock routine does not have to compensate for the automatic leveling feature of the compensator assembly 28. The reset plane lock subroutine is called in block 309 as shown in FIG. 17.

The plane lock variables are initialized in block 310. The speed of the rotor/pentaprism 54 is set at 50 rpm in block 311. The plane lock circuitry is turned on in block 312. The oscillator 66 is activated to modulate the laser beam 12 and a hardware operation is performed as part of block 312. The pulse separator 88 includes a flip-flop which must be reset before signals from the target 64 may be captured. Block 312 performs this hardware operation by pulsing a control line low so that the flip-flop may be reset. The program next enables software input capture interrupts in block 313 which is a software reset similar to the hardware reset in block 312. Block 313 enables the program interrupts so that the data pulses may be tracked. The processor 90 may now expect data from the photodetecting system 32. The variable ActivePlaneLock is set high in block 314 which enables the program to execute plane lock. The reset plane lock subroutine 309 returns to the initialize plane lock subroutine 306 of FIG. 16 in block 315.

The program calculates the encoder positions for the directions of the positive Y or second axis 98, the positive X or first axis 94 and the negative X or first axis 94 in block 316. The direction of the negative Y or second axis 98 is not needed for the plane lock routine as the laser transmitter 10 is typically mounted against a wall or on the floor along the negative Y or second axis 98. However, it will be appreciated by those skilled in the art that the laser transmitter 10 may be mounted in the center of a room or jobsite such that the negative Y or second axis 98 may be calculated. In block 317, the program calculates the encoder positions for the offset around each of the above axes which is plus or minus five (5) degrees as stated above. The initialize plane lock subroutine 306 returns to the start plane lock subroutine 305 of FIG. 15 in block 318.

The program sets main mode to plane lock in block 319. There are a number of different modules or modes which may be executed by the processor 90. Block 319 activates one such module, i.e. plane lock, so as not to overload the processor 90. In decision block 320, the program determines if the laser transmitter 10 is in the horizontal mode in order to determine the number of targets 64 which will be used. If the laser transmitter 10 is in the vertical mode, the program sets the gimbal mode to vertical mode in block 321 to cause the processor 90 to expect reflections from only one target 64. In block 322, the program causes the laser transmitter 10 to level itself along the second axis 98 as stated above. However, if the laser transmitter 10 is in the horizontal mode, the program sets the gimbal mode to two target mode in block 323. After either block 322 or block 323, the start plane lock subroutine 305 returns to the main program 300 in block 324.

Figure 14:
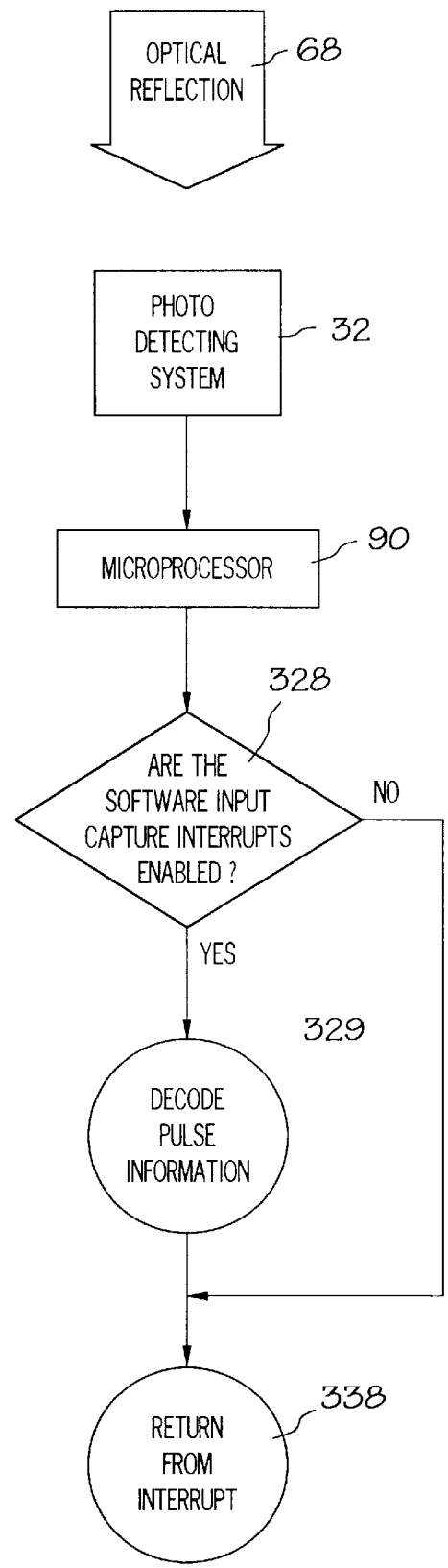

Prior to discussing the last subroutine of the main program 300, the program includes an interrupt routine as shown in FIG. 14. The laser transmitter 10 continually scans for the reflected laser beam 68. As described above, the photodetecting system 32 detects the reflected laser beam 68 and the processor 90 determines the time intervals for each transition which exceeds the set threshold voltage. The interrupt routine is triggered when a reflection which exceeds the set threshold voltage is detected. The decode pulse information subroutine is triggered in block 329 if the program determines that the software input capture interrupts are enabled from block 328.

Figure 21:
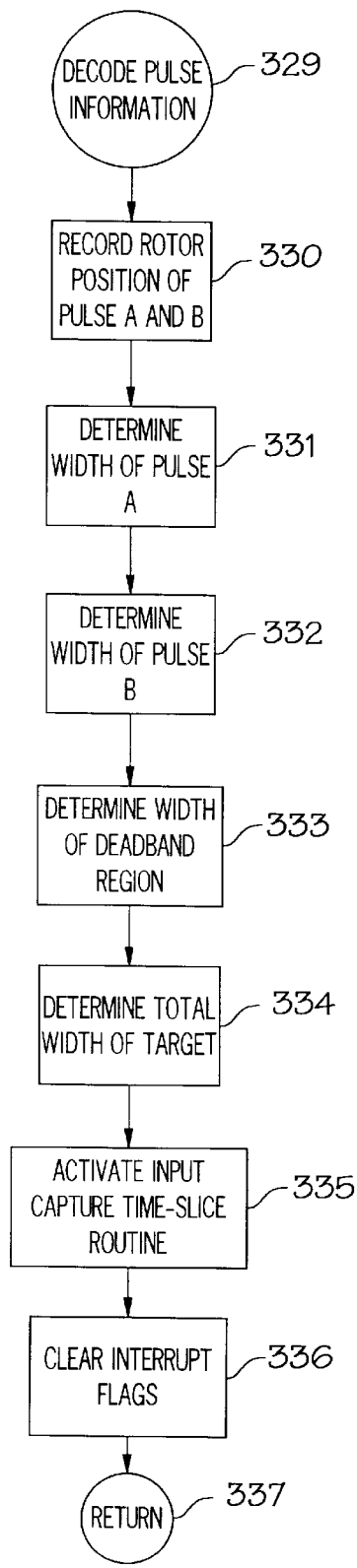

The decode pulse subroutine 329 is shown in FIG. 21. The position of the rotor/pentaprism 54 for each of the pulses 72A and 72B is recorded from the optical encoder 58 in block 330. The program determines the width of the pulses in the two reflective regions 64A, 64C and in the non-reflective region 64B in blocks 331, 332, and 333. The total width of the target 64 is determined in block 334 from the information derived in blocks 331, 332 and 333. In block 335, the program activates the input capture time slice routine 339. The input capture time slice routine 339 is not a subroutine which is immediately executed but is a routine which is placed at the top of the queue priority list so that it is the next routine executed. The program clears the interrupt flags in block 336 so that the additional reflections may be detected and decoded. The decode pulse information routine 329 returns to the interrupt routine from FIG. 14 in block 337. The program returns from the interrupt routine after the decode pulse information routine 329 is executed or if the software input capture interrupts are not enabled from decision block 328.

Figure 22:
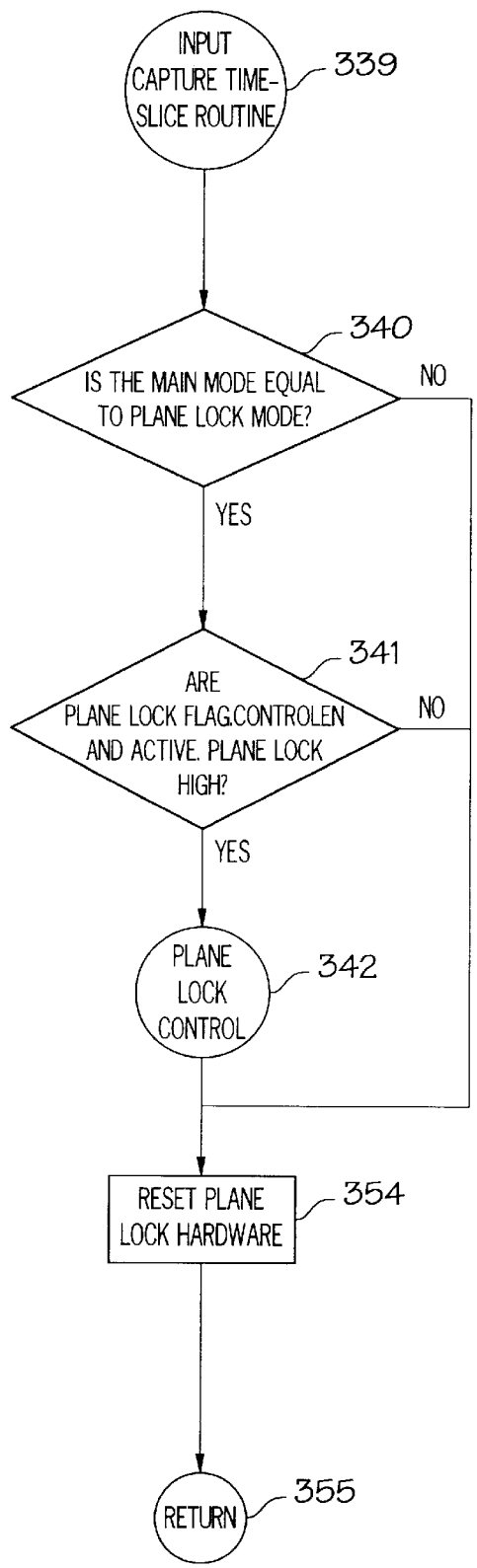
Figure 23:
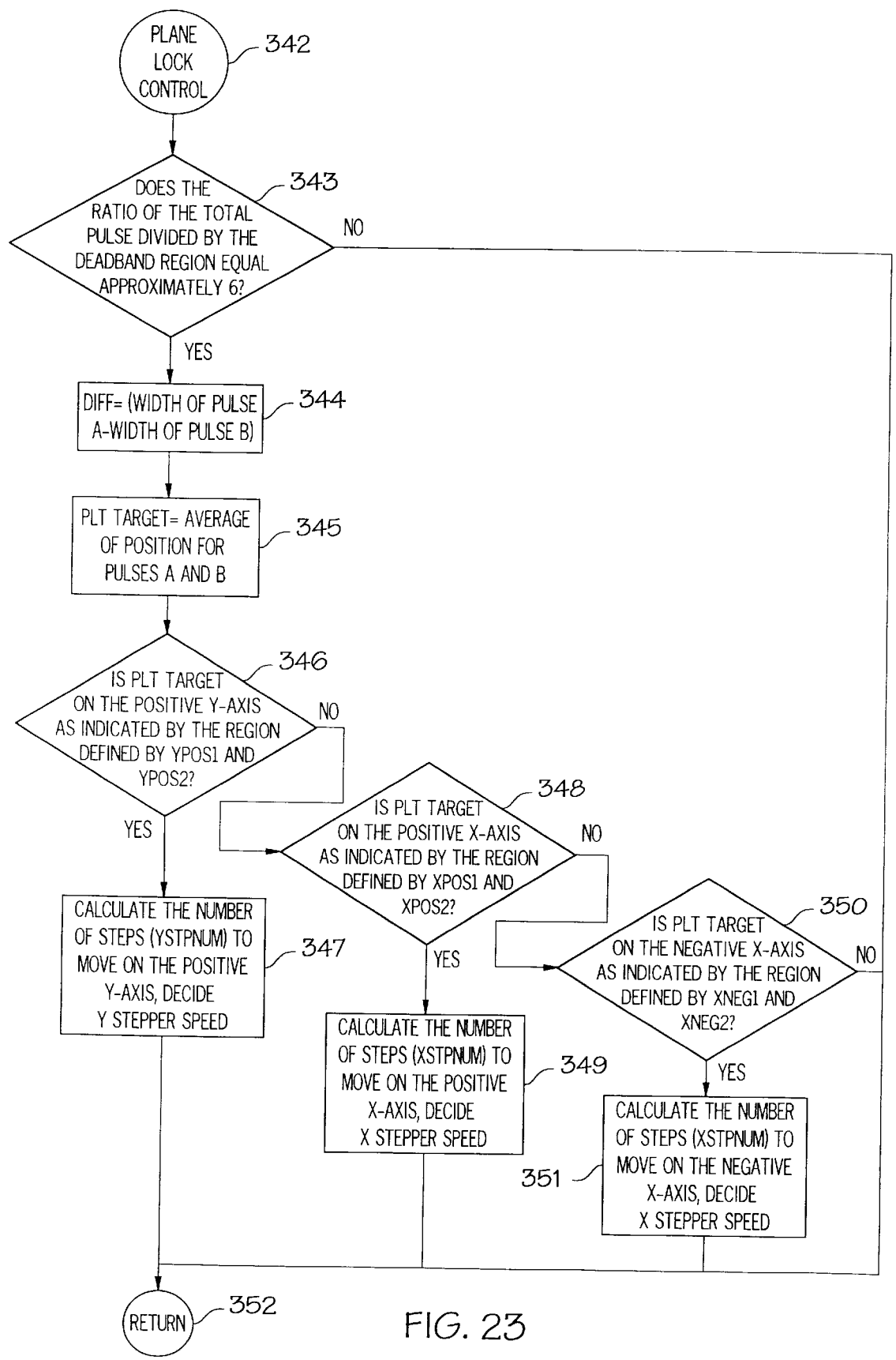

The input capture time slice routine 339 is shown in FIG. 22. The program determines if the main mode is set to the plane lock mode in decision block 340. If in plane lock mode, the program determines if the PlaneLockFlagControlEnable and the ActivePlaneLock variables are set high in decision block 341. If decision block 341 is true, the plane lock control subroutine 342 of FIG. 23 is executed.

The program determines if a valid reflection has occurred in decision block 343. The program determines if the reflection is valid by evaluating the measured widths of the sections 64A, 64B, and 64C as defined by the duration of the time in which the laser beam 12 sweeps across the sections 64A, 64B, and 64C. As the actual widths of the sections 64A, 64B and 64C are known or predetermined, mathematical relationships between the actual widths, i.e. ratios or differences, are also known. Accordingly, the same mathematical relationships between the measured widths may be used to determine if the reflection is valid. Specifically, the reflection is valid if the ratio of the total pulse to the deadband period approximately equals six (6). In the illustrated embodiment, the total width of the target 64 is six inches and the non-reflective region is one inch. It should be apparent that other dimensions and methods may be used to determine if a valid reflection has occurred. It will be appreciated by those skilled in the art that other ratios or mathematical relationships may be used to determine if the reflection is valid. If the reflection is valid, the program calculates the difference of the reflective pulses in block 344. The program next determines the position of the laser beam 12 on the target 64 by taking the average of the position of the reflective pulses in block 345. In blocks 346–351, the program determines which motor 208, 214 to move, in which direction, the number of steps and at what stepper speed based on the position of the laser beam 12 on the target 64. If the laser beam 12 traverses the first or third target regions 64D, 64F, the number of steps in which to move the appropriate motor 208, 214 is set to a defined maximum value and a defined maximum speed. The defined maximum value and the defined maximum speed are set in part based on the calculated distance R to the target 64. If the laser beam 12 traverses the second target region 64E, the actual number of steps to move the appropriate motor 208, 214 is calculated using equation (10) as described above. The stepper speed is also set in part based on the calculated distance R to the target 64. If the reflection is not valid or it the target 64 is not within the defined target regions or after blocks 347, 349, and 351, the plane lock control subroutine returns to input capture time slice routine 339 in block 352. The program resets the plane lock hardware so that additional reflections may be captured in block 354 after the plane lock control subroutine 342 is executed or if either of the decision blocks 340 or 341 are false. The input capture time slice routine 339 returns to the program which is the next routine in the queue in block 355.

Figure 19:
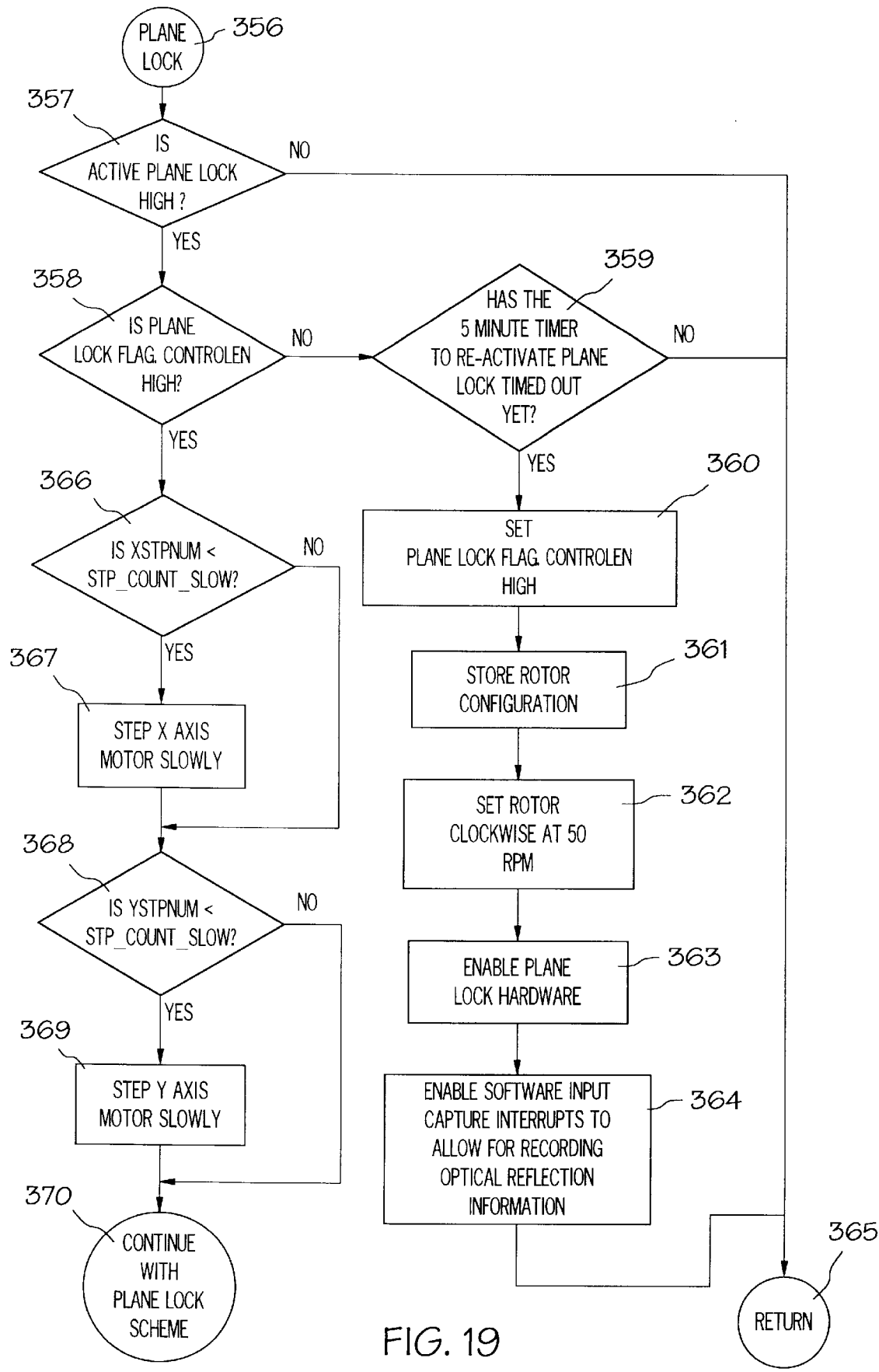

The plane lock subroutine 356 in FIG. 19 is executed after the start plane lock subroutine 305 or if the plane lock routine is already initialized. The program determines if the variable ActivePlaneLock is set high in decision block 357. If the variable is set high which means that the plane lock is still active, the program determines if the variable PlaneLockFlagControlEnable is set high in decision block 358. If the variable PlaneLockFlagControlEnable is low which means that the rotating laser beam 12 is locked on or defines the desired plane as set by the one or two targets 64, the program determines if a five minute timer to reactivate plane lock has timed out in decision block 359. Once the rotating laser beam 12 defines the desired plane, the laser transmitter 10 is set to a user defined configuration for five minutes. After five minutes, the program reenters the plane lock routine by setting the PlaneLockFlagControlEnable variable high in block 360, storing the user defined rotor configuration, i.e. speed, in block 361, setting the speed of the rotor/pentaprism 54 at 50 rpm in block 362, enabling the plane lock hardware/circuitry in block 363, and enabling the software input capture interrupts to allow additional reflections to be detected in block 364. The plane lock subroutine 356 returns to the main program 300 after block 364 or if the variable ActivePlaneLock is low or if the five minute timer has not timed out.

If the variable PlaneLockFlagControlEnable is high, the program determines if the number of steps to move the first axis motor 208 is less than a set variable, STP_Count_Slow, in decision block 366. If the number of steps to move the first axis motor 208 is less than the set variable, the rotating laser beam 12 intersects or nearly intersects the center 64G of the target 64 located along the first axis 94 such that the speed in which to step the first axis motor 208 is slowed in block 367. The set variable STP_Count_Slow is set by the processor 90 and may be set to any desired value based in part on the distance R and the slope of the non-reflective section 64B. The program next determines if the number of steps to move the second axis motor 214 is less than the set variable in block 368 after block 367 or if the number of steps to move the first axis motor 208 is greater than the set variable. If the number of steps to move the second axis motor 214 is less than the set variable, the rotating laser beam 12 intersects or nearly intersects the center 64G of the target 64 located along the second axis 98 such that the speed in which to step the second axis motor 214 is slowed in block 369. The program continues with the plane lock subroutine in block 370 after block 369 or if the number of steps to move the second axis motor 214 is greater than the set variable.

Figure 20:
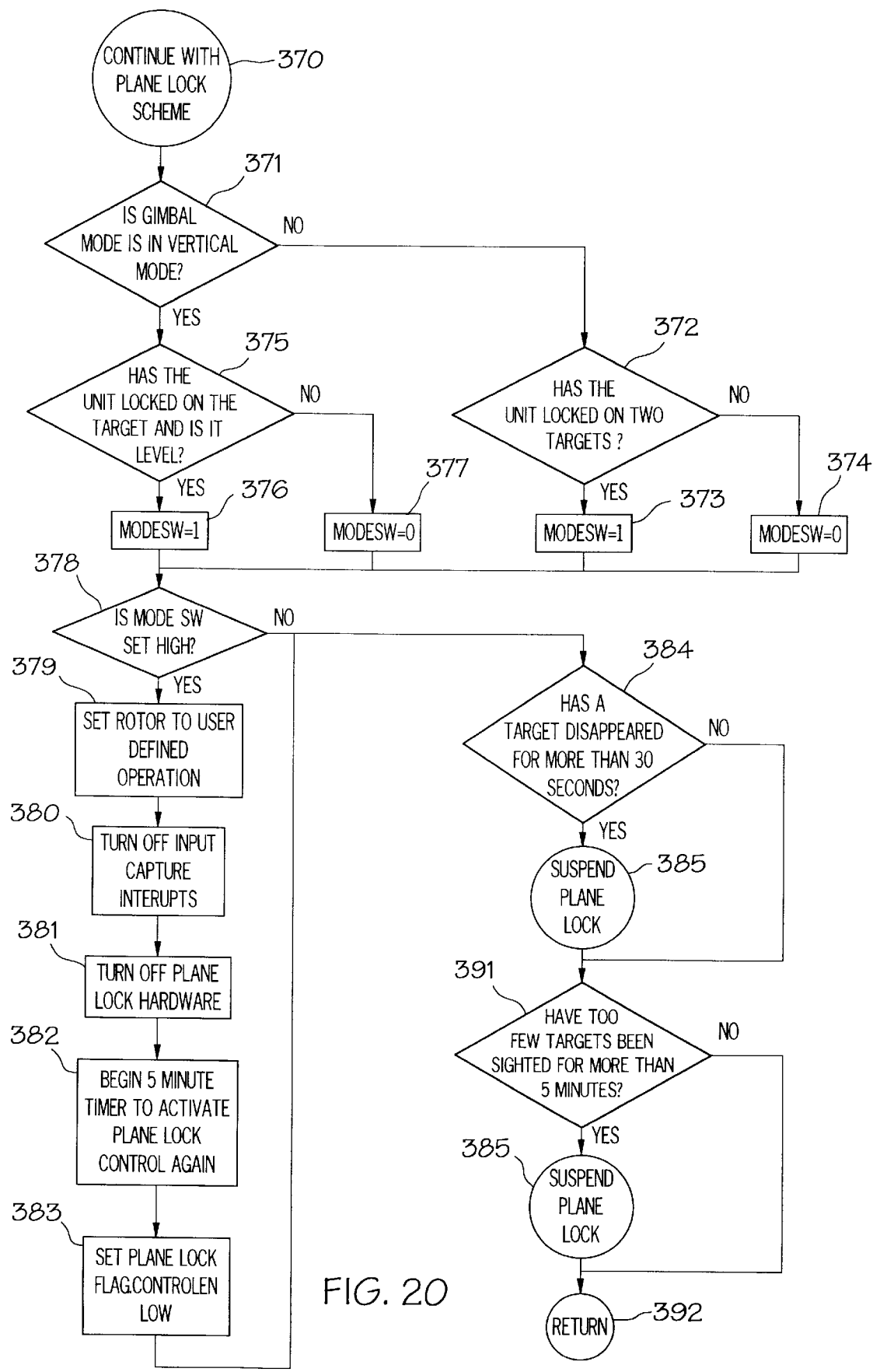

The plane lock subroutine 356 continues in FIG. 20. The program determines if the gimbal mode is in vertical mode in decision block 371. If the gimbal mode is in horizontal mode, the program determines if the rotating laser beam 12 is locked on the two targets $64_1$, $64_2$ in decision block 372. If the rotating laser beam 12 is locked on the two targets $64_1$, $64_2$, the mode switch is set high in block 373 otherwise it is set low in block 374. If the gimbal mode is in vertical mode, the program determines if the rotating laser beam 12 is locked on one target 64 and that the laser transmitter 10 is level in decision block 375. If the decision block 375 is true, the mode switch is set high in block 376 otherwise it is set low in block 377.

After blocks 373, 374, 376 or 377, the program determines if the mode switch is high in decision block 378. If the mode switch is high, the program sets the rotor/pentaprism 54 to the user defined configuration in block 379, turns off the software input capture interrupts in block 380, turns off the plane lock hardware in block 381, activates the five minute timer in block 382 and sets the PlaneLockFlagControlEnable variable low in block 383. After block 383 or if the mode switch is low, the program determines if the target 64 has disappeared for more than 30 seconds in decision block 384. If the target 64 has disappeared, the program executes the suspend plane lock subroutine in block 385. After the suspend plane lock subroutine 385 or if the target 64 has not disappeared, the program determines if too few targets have been sighted for more than five minutes in decision block 391. If the gimbal mode is in horizontal mode, the program expects to receive reflections from the two targets 64₁, 64₂. If both targets 64₁, 64₂ are not sighted in five minutes the programs executes the suspend plane lock subroutine in block 385. After the second suspend plane lock block 385 or if the both targets 64₁, 64₂ have been sighted, the program returns to the main program 300 in block 392.

The suspend plane lock subroutine 385 is shown in FIG. 18. The program terminates plane lock by disabling the software input capture interrupts in block 386, turning off the plane lock hardware in block 387, stopping the rotor/pentaprism 54 in block 388 and setting the variable ActivePlaneLock low in block 389. The suspend plane lock subroutine 385 returns to the plane lock subroutine 356 in block 390.

In the illustrated embodiment, the slope of the non-reflective section 64B in the second target region 64E is approximately 45 degrees. It will be appreciated by those skilled in the art that the slope may be greater or less than 45 degrees. A slope which approaches the horizontal or zero degrees will increase the gain and sensitivity of the system. Conversely, a slope which approaches the vertical or ninety degrees will decrease the gain and sensitivity of the system. It should be apparent that the illustrated embodiment is digitally based. However, it will be appreciated by those skilled in the art that an analog based system with asynchronous components may be used without departing from the scope of the present invention.

Having described the invention in detail and by reference to preferred embodiments thereof, it will be apparent that modifications and variations are possible without departing from the scope of the invention which is defined in the appended claims.

What is claimed is:

1. A process for adjusting the orientation of a plane in which a laser beam is rotated, said process comprising the steps of:

projecting said laser beam from a laser source such that it rotates in a plane and sweeps across at least a first target, said first target having a plurality of reflective sections and at least one non-reflective section;

detecting a reflected laser beam from said first target and generating a first signal having a first waveform representative of said reflected laser beam from said first target; and adjusting the orientation of said plane in response to said first signal.

2. The process of claim 1, wherein said plurality of reflective sections includes a first reflective section and a second reflective section with said at least one non-reflective section positioned therebetween.

3. The process of claim 2, wherein said at least one non-reflective section includes a first portion which slopes across said first and second reflective sections.

4. The process of claim 2, wherein said first target comprises a first target region in which a first dimension of said first reflective region is greater than a second dimension of said second reflective region, a second target region in which said first dimension decreases proportionally with an increase of said second dimension, and a third target region in which said first dimension is less than said second dimension, wherein said first dimension substantially equals said second dimension substantially in a center of said second target region.

5. The process of claim 4, wherein said step of adjusting the orientation of said plane comprises the steps of:

calculating a distance in which to move said laser source so that said plane intersects said center of said second target region; and moving said laser source said distance so that said plane intersects said center of said second target region.

6. The process of claim 5, wherein said distance is determined by the equation:

$$Z = m^* w^* R(TP_1 - TP_3)/2$$

where:

m defines a slope of said at least one non-reflective section in said second target region;

w defines an angular velocity of said rotating laser beam;

R defines a distance between said target and said laser transmitter;

$TP_1$ defines a time period in which said rotating laser beam sweeps across said first reflective section of said target; and $TP_3$ defines a time period in which said rotating laser beam sweeps across said second reflective section of said target.

7. The process of claim 4, wherein said step of adjusting the orientation of said plane comprises the steps of:

calculating an angle in which to adjust an angular position of said laser source so that said plane intersects said center of said second target region; and adjusting said angular position of said laser source by said angle so that said plane intersects said center of said second target region.

8. The process of claim 7, wherein said angle is determined by the equation:

$$\theta = m^* w (TP_1 - TP_3)/2$$

where:

m defines a slope of said at least one non-reflective section in said second target region;

w defines an angular velocity of said rotating laser beam;

$TP_1$ defines a time period in which said rotating laser beam sweeps across said first reflective section of said target; and $TP_3$ defines a time period in which said rotating laser beam sweeps across said second reflective section of said target.

9. The process of claim 2, wherein a first dimension of said first reflective section increases in a first direction while a second dimension of said second reflective section decreases in said first direction, said rotating laser beam sweeps across said first target generally perpendicular to said first direction.

10. The process of claim 9, wherein said first waveform includes a first portion having a first duration corresponding to a time period when said laser beam traverses said first reflective section and a second portion having a second duration corresponding to a time period when said laser beam traverses said second reflective section, such that said planar orientation of said laser beam is adjusted until a ratio of said first duration to said second duration substantially equals a first value.

11. The process of claim 9, wherein said first waveform includes a first portion having a first duration corresponding to a time period when said laser beam traverses said first reflective section and a second portion having a second duration corresponding to a time period when said laser beam traverses said second reflective section, such that said planar orientation of said laser beam is adjusted until a difference between said first and second durations substantially equals a first value.

12. The process of claim 1, further comprising the step of determining a distance between said laser source and said first target.

13. The process of claim 1, further comprising the step of amplitude modulating said laser beam.

14. The process of claim 1, further comprising the step of dithering said laser beam across said first target.

15. The process of claim 1, further comprising the step of determining if said reflected laser beam is a valid reflection.

16. The process of claim 15, wherein the step of determining if said reflected laser beam is a valid reflection comprises the steps of:
measuring a width for each of at least two of said sections of said target based on said signal;
calculating a measured ratio based on said measured widths; and
determining if said measured ratio corresponds to an actual ratio based on actual widths of said sections of said target.

17. The process of claim 1, further comprising the step of determining if said first target has moved.

18. The process of claim 1, further comprising the step of positioning said first target at a first point having a predetermined angular orientation with respect to a first axis, and wherein said step of projecting said laser beam comprises the step of projecting said laser beam so that said laser beam intersects a second point having a predetermined angular orientation with respect to a second axis, and wherein said step of adjusting the orientation of said plane comprises the step of adjusting said plane such that it corresponds to a plane defined by said first point, said second point and a position of said laser source.

19. The process of claim 18, wherein said step of projecting said laser beam so that said laser beam intersects a second point having a predetermined angular orientation with respect to a second axis comprises the step of adjusting said plane such that it is substantially parallel with respect to a ground surface.

20. The process of claim 18, wherein said step of projecting said laser beam so that said laser beam intersects a second point having a predetermined angular orientation with respect to a second axis comprises the step of adjusting said plane such that it is substantially perpendicular with respect to a ground surface.

21. The process of claim 1, further comprising the steps of:
positioning said first target at a first point having a predetermined angular orientation with respect to a first axis;

positioning a second target at a second point, said second target having a plurality of reflective sections and at least one non-reflective section, said second point having a predetermined angular orientation with respect to a second axis, and
detecting said reflected laser beam from said second target and generating a second signal having a second waveform representative of said reflected laser beam from said second target;
and wherein said step of adjusting the orientation of said plane comprises the step of adjusting the orientation of said plane in response to said first and second signals so that plane corresponds to a plane defined by said first point, said second point and said position of said laser source.

22. The process of claim 1, further comprising the step of establishing predetermined gain and threshold values for detecting said reflected laser beam.

23. The process of claim 22, further comprising the step of adjusting at least one of said gain or threshold values if said target has not been detected for a predetermined period of time.

24. A process for adjusting the orientation of a plane in which a laser beam is rotated, said process comprising the steps of:
projecting said laser beam from a laser source such that it rotates in a plane and sweeps across a first target and a second target, said first and second targets each having a plurality of reflective sections and at least one non-reflective section;
detecting a reflected laser beam from said first and second targets and generating first and second signals having first and second waveforms representative of said reflected laser beam from said first and second targets, respectively;
adjusting the orientation of said plane in response to said first and second signals.

25. The process of claim 24, further comprising the steps of:
positioning said first target at a first point having a predetermined angular orientation with respect to a first axis;
positioning said second target at a second point having a predetermined angular orientation with respect to a second axis; and
positioning said laser source at a third point, said third point corresponding to an intersection of said first and second axes;
and wherein said step adjusting the orientation of said plane in response to said first and second signals comprises the step of adjusting a position of said laser source so that the orientation of said plane corresponds to a plane defined by said first, second and third points.

26. The process of claim 24, wherein said first waveform includes a first portion having a first duration corresponding to a time period when said laser beam traverses a first reflective section of said first target and a second portion having a second duration corresponding to a time period when said laser beam traverses a second reflective section of said first target, and wherein said second waveform includes a third portion having a third duration corresponding to a time period when said laser beam traverses a third reflective section of said second target and a fourth portion having a fourth duration corresponding to a time period when said laser beam traverses a fourth reflective section of said second target, such that the orientation of said plane is adjusted until a first ratio of said first duration to said second duration substantially equals a first value and a second ratio of said third duration to said fourth duration substantially equals a second value.

27. The process of claim 24, wherein said first value substantially equals said second value.

28. The process of claim 24, wherein said first waveform includes a first portion having a first duration corresponding to a time period when said laser beam traverses a first reflective section of said first target and a second portion having a second duration corresponding to a time period when said laser beam traverses a second reflective section of said first target, and wherein said second waveform includes a third portion having a third duration corresponding to a time period when said laser beam traverses a third reflective section of said second target and a fourth portion having a fourth duration corresponding to a time period when said laser beam traverses a fourth reflective section of said second target, such that the orientation of said plane is adjusted until a first difference between said first and second durations substantially equals a first value and a second difference between said third and fourth durations substantially equals a second value.

29. The process of claim 28, wherein said first value substantially equals said second value.

30. A process for adjusting the orientation of a plane in which a laser beam is rotated, said process comprising the steps of:
projecting said laser beam from a laser source such that it rotates in a plane and sweeps across at least a first target, said first target having a plurality of reflective sections and at least one non-reflective section;
detecting a reflected laser beam from said first target and generating a first signal having a first waveform representative of said reflected laser beam;
indicating a direction to move said laser source in response to said first signal so as to adjust the orientation of said plane.

31. The process of claim 30, further comprising the steps of;
projecting said laser beam such that it sweeps across a second target having a plurality of reflective sections and at least one non-reflective section,
detecting said reflected laser beam from said second target and generating a second signal having a second waveform representative of said reflected laser beam from said second target; and
indicating another direction to move said laser source in response to said second signal so as to further adjust the orientation of said plane.

32. The process of claim 31, further comprising the steps of
positioning said first target at a first point;
positioning said second target at a second point; and
positioning said laser source at a third point, such that said orientation of said plane of said rotating laser beam corresponds to a plane defined by said first, second and third points.

33. A laser transmitting system comprising:
at least a first target having a plurality of reflective sections and at least one non-reflective section;
a laser source for projecting a rotating laser beam, said laser beam being swept across said first target;
a positioning device coupled to said laser source, said positioning device including a first member and a second member for adjusting an angular orientation of said laser source with respect to a first axis and with respect to a second axis;
a photodetecting system receiving a reflected laser beam from said first target and generating a first signal having a first waveform representative of said reflected laser beam from said first target;
a processor adapted to receive said first signal and programmed to control at least one of said first and second members of said positioning device in response to said first signal.

34. The system of claim 33, wherein said target comprises a first target region in which a first dimension of said first reflective region is greater than a second dimension of said second reflective region, a second target region in which said first dimension decreases proportionally with an increase of said second dimension, and a third target region in which said first dimension is less than said second dimension, wherein said first dimension substantially equals said second dimension substantially in a center of said second target region.

35. The system of claim 34, wherein said processor is further programmed to calculate a distance in which to move said laser source so that said plane intersects said center of said second target region, and to control said at least one of said first and second members so as to move said laser source said distance so said plane intersects said center of said second target region.

36. The system of claim 34, wherein said distance is calculated using the formula:

$$Z = m^* w^* R(TP_1 - TP_3)/2$$

where:
m defines a slope of said at least one non-reflective section in said second target region;
w defines an angular velocity of said rotating laser beam;
R defines a distance between said target and said laser transmitter;
$TP_1$ defines a time period in which said rotating laser beam sweeps across said first reflective section of said target; and
$TP_3$ defines a time period in which said rotating laser beam sweeps across said second reflective section of said target.

37. The system of claim 34, wherein said processor is further programmed to calculate an angle in which to adjust said angular position of said laser source so that said plane intersects said center of said second target region, and to control said at least one of said first and second members so as to adjust said angular position of said laser source by said angle so that said plane intersects said center of said second target region.

38. The system of claim 37, wherein said angle is determined by the equation:

$$\theta = m^* w(TP_1 - TP_3)/2$$

where:
m defines a slope of said at least one non-reflective section in said second target region;
w defines an angular velocity of said rotating laser beam;
$TP_1$ defines a time period in which said rotating laser beam sweeps across said first reflective section of said target; and
$TP_3$ defines a time period in which said rotating laser beam sweeps across said second reflective section of said target.

39. The system of claim 33, wherein said plurality of reflective sections includes a first reflective section and a second reflective section with said at least one non-reflective section positioned therebetween.

40. The system of claim 39, wherein said at least one non-reflective section includes a first portion which slopes across said first and second reflective sections.

41. The system of claim 39, wherein a first dimension of said first reflective section increases in a first direction while a second dimension of said second reflective section decreases in said first direction, said rotating laser beam being swept across said first target generally perpendicular to said first direction.

42. The system of claim 33, wherein said first waveform includes a first portion having a first duration corresponding to a time period when said laser beam traverses said first reflective section and a second portion having a second duration corresponding to a time period when said laser beam traverses said second reflective section, said processor controlling said at least one of said first and second members of said positioning device until a ratio of said first duration to said second duration substantially equals a first value.

43. The system of claim 33, wherein said first waveform includes a first portion having a first duration corresponding to a time period when said laser beam traverses said first reflective section and a second portion having a second duration corresponding to a time period when said laser beam traverses said second reflective section, said processor controlling said at least one of said first and second members of said positioning device until a difference between said first and second durations substantially equals a first value.

44. The system of claim 33, wherein said processor is further programmed to determine a distance between said laser source and said first target.

45. The system of claim 33, wherein said laser beam is amplitude modulated.

46. The system of claim 33, wherein said laser beam is dithered across said first target.

47. The system of claim 33, wherein said processor is further programmed to determine if said reflected laser beam is a valid reflection.

48. The system of claim 47, wherein said processor is programmed to:
   determine a measured width for each of at least two of said sections of said target based on said signal,
   calculate a measured ratio based on said measured widths; and
   determine if said measured ratio corresponds to an actual ratio based on actual widths of said sections of said target, so as to validate said reflected laser beam.

49. The system of claim 33, wherein said processor is further programmed to determine if said first target has moved.

50. The system of claim 33, wherein said first target is positioned at a first point having a predetermined angular orientation with respect to one of said first and second axes, and wherein said processor is further programmed to control the other of said first and second members of said positioning device so that said laser beam intersects a second point having a predetermined angular orientation with respect to the other of said first and second axes, said processor controlling said first and second members so that said rotating laser beam forms a plane defined by said first point, said second point and a position of said laser source.

51. The system of claim 33, further comprising a second target having a plurality of reflective sections and at least one non-reflective section, said first target being positioned at a first point having a predetermined angular orientation with respect to said first axis, said second target being positioned at a second point having a predetermined angular orientation with respect to said second axis, said photodetecting system generating a second signal having a second waveform representative of said reflected laser beam from said second target, and said processor further adapted to receive said second signal and programmed to control said first and second members to adjust said angular position of said light source with respect to said first and second axes so that said rotating laser beam forms a plane defined by said first point, said second point and a position of said laser source.

52. The system of claim 33, wherein said processor is further programmed to establish predetermined gain and threshold values for detecting said reflected laser beam.

53. The system of claim 52, wherein said processor is further programmed to adjust at least one of said gain or threshold values if said target has not been detected for a predetermined period of time.

54. A laser transmitting system comprising:
   a first target having a plurality of reflective sections and at least one non-reflective section, said first target positioned at a first point having a predetermined angular orientation with respect to a first axis;
   a second target having a plurality of reflective sections and at least one non-reflective section, said second target positioned at a second point having a predetermined angular orientation with respect to a second axis;
   a laser source positioned at a third point corresponding to an intersection of said first and second axes and projecting a rotating laser beam, said laser beam being swept across said first target and said second target;
   a positioning device coupled to said laser source, said positioning device including a first member and a second member for adjusting an angular orientation of said laser source with respect to said first axis and with respect to said second axis;
   a photodetecting system receiving a reflected laser beam from said first and second targets and generating first and second signals having first and second waveforms representative of said reflected laser beam from said first and second targets, respectively;
   a processor adapted to receive said first and second signals and programmed to control said first and second members of said positioning device in response to said first and second signals so that said rotating laser beam forms a plane defined by said first, second and third points.

55. The system of claim 54, wherein said first waveform includes a first portion having a first duration corresponding to a time period when said laser beam traverses a first reflective section of said first target and a second portion having a second duration corresponding to a time period when said laser beam traverses a second reflective section of said first target, and wherein said second waveform includes a third portion having a third duration corresponding to a time period when said laser beam traverses a third reflective section of said second target and a fourth portion having a fourth duration corresponding to a time period when said laser beam traverses a fourth reflective section of said second target, such that said first member is adjusted until a first ratio of said first duration to said second duration substantially equals a first value and said second member is adjusted until a second ratio of said third duration to said fourth duration substantially equals a second value.

56. The system of claim 55, wherein said first value substantially equals said second value.

57. The system of claim 54, wherein said first waveform includes a first portion having a first duration corresponding to a time period when said laser beam traverses a first reflective section of said first target and a second portion having a second duration corresponding to a time period when said laser beam traverses a second reflective section of said first target, and wherein said second waveform includes a third portion having a third duration corresponding to a time period when said laser beam traverses a third reflective section of said second target and a fourth portion having a fourth duration corresponding to a time period when said laser beam traverses a fourth reflective section of said second target, such that said first member is adjusted until a first difference between said first and second durations substantially equals a first value and said second member is adjusted until a second difference between said third and fourth durations substantially equals a second value.

58. The system of claim 57, wherein said first value substantially equals said second value.

59. A laser transmitting system comprising:
- at least a first target having a plurality of reflective sections and at least one non-reflective section;
- a laser source for projecting a rotating laser beam in a plane, said laser beam being swept across said first target;
- a positioning device coupled to said laser source, said positioning device including a first member and a second member for adjusting an angular orientation of said laser source with respect to a first axis and with respect to a second axis;
- a photodetecting system receiving a reflected laser beam from said first target and generating a first signal having a first waveform representative of said reflected laser beam from said first target;
- a processor adapted to receive said first signal and programmed to control an indicator device in response to said first signal, said indicator device indicating a direction to rotate one of said first and second members of said positioning device so as to adjust the orientation of said plane of said rotating laser beam.

60. The laser transmitting device of claim 59, further comprising a second target having a plurality of reflective sections and at least one non-reflective section, said processor adapted to receive said second signal and further programmed to control said indicator device in response to said second signal, said indicator device indicating a direction to rotate the other of said first and second members of said position mechanism so as to adjust the orientation of said plane of said rotating laser beam.

61. The laser transmitting device of claim 60, wherein said first target is positioned at a first point, said second target being positioned at a second point, and said laser source being positioned at a third point, such that said orientation of said plane of said rotating laser beam corresponds to a plane defined by said first, second and third points.

* * * * *